United States Patent
Kimura et al.

(10) Patent No.: US 6,510,686 B2
(45) Date of Patent: Jan. 28, 2003

(54) EXHAUST GAS PURIFIER FOR INTERNAL COMBUSTION ENGINE AND METHOD FOR PURIFYING EXHAUST GAS

(75) Inventors: Koichi Kimura, Susono (JP); Toshiaki Tanaka, Numazu (JP); Shinya Hirota, Susono (JP); Kazuhiro Itoh, Mishima (JP); Takamitsu Asanuma, Susono (JP); Koichiro Nakatani, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/814,806

(22) Filed: Mar. 23, 2001

(65) Prior Publication Data

US 2001/0027646 A1 Oct. 11, 2001

(30) Foreign Application Priority Data

Mar. 27, 2000 (JP) .................................. 2000-090755
Mar. 28, 2000 (JP) .................................. 2000-093023
Jul. 24, 2000 (JP) .................................. 2000-221877

(51) Int. Cl.$^7$ .................................................. F01N 3/00
(52) U.S. Cl. .............................. 60/296; 60/274; 60/288; 60/297
(58) Field of Search .................... 60/274, 286, 296, 60/297, 311, 288; 55/DIG. 30

(56) References Cited

U.S. PATENT DOCUMENTS

| | | | | |
|---|---|---|---|---|
| 2,946,651 A | * | 7/1960 | Houdry | 60/296 |
| 3,796,546 A | * | 3/1974 | Poullot et al. | 60/296 |
| 4,276,071 A | * | 6/1981 | Outland | 60/311 |
| 4,404,798 A | * | 9/1983 | Takagi et al. | 60/296 |
| 4,875,336 A | * | 10/1989 | Hayashi et al. | 60/288 |
| 4,916,897 A | * | 4/1990 | Hayashi et al. | 60/296 |
| 5,065,574 A | * | 11/1991 | Bailey | 60/274 |
| 5,260,035 A | * | 11/1993 | Lachman et al. | 55/DIG. 30 |
| 5,566,545 A | * | 10/1996 | Hijikata et al. | 60/311 |
| 5,768,888 A | * | 6/1998 | Matros et al. | 60/296 |
| 5,884,474 A | * | 3/1999 | Topsøe | 60/296 |
| 5,941,066 A | * | 8/1999 | Araki et al. | 60/311 |
| 6,199,375 B1 | * | 3/2001 | Russell | 60/311 |
| 6,314,722 B1 | * | 11/2001 | Matros et al. | 60/296 |

FOREIGN PATENT DOCUMENTS

| | | | |
|---|---|---|---|
| DE | 664 371 | | 8/1938 |
| EP | 0 984 142 A | | 3/2000 |
| JP | 60-135613 | * | 7/1985 |
| JP | 60 235620 | | 11/1985 |
| JP | 61-223215 | * | 10/1986 |
| JP | 01 240713 | | 9/1989 |
| JP | 05 163929 | | 6/1993 |
| JP | 05 179928 | | 7/1993 |
| JP | 5-222919 | * | 8/1993 |
| JP | A 06-159037 | | 6/1994 |
| JP | A 06-272541 | | 9/1994 |
| JP | 7-4225 | * | 1/1995 |
| JP | 07 189655 | | 7/1995 |
| JP | B2 7-106290 | | 11/1995 |
| JP | A 09-094434 | | 4/1997 |
| JP | A 11-300165 | | 11/1999 |
| JP | B2 30-12249 | | 12/1999 |
| JP | A 2000-018026 | | 1/2000 |

* cited by examiner

*Primary Examiner*—Thomas Denion
*Assistant Examiner*—Tu M. Nguyen
(74) *Attorney, Agent, or Firm*—Oliff & Berridge, PLC

(57) ABSTRACT

A reversal device reverses upstream and downstream sides of a particulate filter. First and second collecting surfaces of a collecting wall are used alternately to collect particulates. In order to ensure that a portion of exhaust gas bypasses the particulate filter while a valve body is switched from one position to the other position to reverse the upstream and downstream sides of the particulate filter, the reversal device switches the valve body as soon as the amount of particulates discharged from a combustion chamber of an engine becomes equal to or smaller than a set discharge amount.

16 Claims, 27 Drawing Sheets

COMBUSTION PRESSURE

COMBUSTION PRESSURE

FLOW OF EXHAUST GAS

FLOW OF EXHAUST GAS

EXHAUST GAS PURIFIER FOR INTERNAL COMBUSTION ENGINE AND METHOD FOR PURIFYING EXHAUST GAS

INCORPORATION BY REFERENCE

The disclosures of Japanese Patent Application Nos. 2000-090755 filed on Mar. 27, 2000, 2000-093023 filed on Mar. 28, 2000 and 2000-221877 filed on July 24, including the specifications, drawings and abstracts are incorporated herein by reference in their entirety.

BACKGROUND OF THE INVENTION

1. Field of the Invention

The invention relates to an exhaust gas purifier for an internal combustion engine and method for purifying the exhaust gas.

2. Description of Related Art

Particulates mainly composed of soot are included in the exhaust gas in an internal combustion engine, especially a diesel engine. Because particulates are noxious, it has been proposed to dispose a filter, which collects particulates before they are discharged into the atmosphere, in an exhaust system of the engine. In order to prevent an increase in the exhaust gas resistance due to the clogging, such a filter is required to burn out the particulates collected therein.

During such regeneration of the filter, particulates burn through ignition as soon as they reach about 600° C. However, since the temperature of the exhaust gas in a diesel engine is usually much lower than 600° C., some measures are usually required for the purpose of heating the filter itself. Japanese Published Patent No. HEI 7-106290 discloses that the particulates on a filter continuously burn out approximately at 400° C., namely, at the temperature of exhaust gas during normal operation of a diesel engine if a platinum-family metal and an alkaline earth metal oxide are carried on the filter.

However, the use of this filter does not guarantee that the temperature of exhaust gas is always approximately equal to 400° C. In some operation states, a great amount of particulates may be discharged from the diesel engine, and the particulates that have not burnt out during each cycle may be gradually stacked on the filter.

If a certain amount of particulates are stacked on this filter, the capability to burn out the particulates deteriorates substantially to the extent of disabling the filter from being regenerated. Thus, even if such a filter is simply disposed in an exhaust system of an engine, the filter may get clogged soon.

SUMMARY OF THE INVENTION

It is an object of the invention to provide an exhaust gas purifier for an internal combustion engine and method for purifying the exhaust gas, which are capable of preventing the clogging of a particulate filter through reversal of upstream and downstream sides thereof with a simple structure and reducing the amount of particulates discharged into the atmosphere at the time of the reversal.

An exhaust gas purifier for an internal combustion engine according to a first aspect of the invention comprises a particulate filter disposed in an exhaust system of the engine to collect and oxidize particulates and a reversal device for reversing upstream and downstream sides of the particulate filter. The particulate filter has a collecting wall for collecting particulates. The collecting wall has first and second collecting surfaces. The first and second collecting surfaces of the collecting wall are used alternately to collect particulates through reversal of the upstream and downstream sides of the particulate filter by the reversal device. The reversal device has a valve body and reverses the upstream and downstream sides of the particulate filter by switching the valve body from one position to the other position. At least a portion of exhaust gas bypasses the particulate filter while the valve body is being switched from one position to the other position. The reversal device reverses the upstream and downstream sides of the particulate filter if the amount of particulates discharged from a combustion chamber of the engine has become equal to or smaller than a set discharge amount.

In some operation states, a certain amount of particulates remain on the first collecting surface of the collecting wall due to the insufficient oxidation of the particulates. However, according to the aforementioned construction, since the reversal device reverses the upstream and downstream sides of the particulate filter, no more particulates are stacked on the first collecting surface of the collecting wall and the residual particulates are gradually removed through oxidation. At the same time, the second collecting surface of the collecting wall starts collecting and oxidizing particulates. Thus, since the first and second collecting surfaces of the collecting wall are used alternately due to the reversal of the upstream and downstream sides of the particulate filter, the clogging of the particulate filter can be prevented. Furthermore, since the valve body is switched to reverse the upstream and downstream sides of the particulate filter when the amount of particulates discharged from the combustion chamber of the engine is equal to or smaller than the set discharge amount, there is no possibility that a great amount of particulates be included in exhaust gas. Even if a portion of exhaust gas has bypassed the particulate filter during the switching of the valve body, it is possible to reduce the amount of particulates discharged into the atmosphere.

In the aforementioned aspect, an active oxygen discharging agent may be carried on the collecting wall so that active oxygen discharged from the active oxygen discharging agent oxidizes particulates.

In the aforementioned aspect, the active oxygen discharging agent may absorb and retain oxygen if there is an excessive amount of oxygen around, and discharge the retained oxygen in the form of active oxygen if the concentration of ambient oxygen decreases.

In the aforementioned aspect, it may be determined that the discharge amount of particulates has become equal to or smaller than the set discharge amount as soon as it is judged that the engine is being decelerated, and the upstream and downstream sides of the particulate filter may be reversed.

In the aforementioned aspect, it may be judged upon detection of depression of a brake pedal that the engine is being decelerated.

In the aforementioned aspect, it may be judged upon detection of a decrease in the depression amount of an accelerator pedal that the engine is being decelerated.

In the aforementioned aspect, the reversal device may not reverse the upstream and downstream sides of the particulate filter even if the discharge amount of particulates has become equal to or smaller than the set discharge amount unless a set period has elapsed or a set running distance has been covered after the reversal of the upstream and downstream sides of the particulate filter.

In the aforementioned aspect, the reversal device may increase the switching speed of the valve body if it is judged during the switching of the valve body that the engine is being accelerated.

In the aforementioned aspect, it may be determined that the discharge amount of particulates has become equal to or smaller than the set discharge amount as soon as it is judged that the fuel injection amount is equal to or smaller than a set injection amount, and the upstream and downstream sides of the particulate filter may be reversed.

In the aforementioned aspect, it may be determined that the discharge amount of particulates has become equal to or smaller than the set discharge amount as soon as it is judged that the depression amount of an accelerator pedal is equal to or smaller than a set depression amount, and the upstream and downstream sides of the particulate filter may be reversed.

In the aforementioned aspect, it may be determined that the discharge amount of particulates has become equal to or smaller than the set discharge amount as soon as it is judged that a clutch pedal has been depressed, and the upstream and downstream sides of the particulate filter may be reversed.

An exhaust gas purifier for an internal combustion engine according to a second aspect of the invention comprises a particulate filter disposed in an exhaust system of the engine to collect and oxidize particulates and a reversal device for reversing upstream and downstream sides of the particulate filter. The particulate filter has a collecting wall for collecting particulates. The collecting wall has first and second collecting surfaces. The first and second collecting surfaces of the collecting wall are used alternately to collect particulates through reversal of the upstream and downstream sides of the particulate filter by the reversal device. The reversal device has a valve body and reverses the upstream and downstream sides of the particulate filter by switching the valve body from one position to the other position. At least a portion of exhaust gas bypasses the particulate filter while the valve body is being switched from one position to the other position. The reversal device reverses the upstream and downstream sides of the particulate filter at a switching speed corresponding to an operation state of the engine.

As described above, the aforementioned construction makes it possible to prevent the clogging of the particulate filter through the reversal of the upstream and downstream sides of the particulate filter. In addition, the valve body is switched to reverse the upstream and downstream sides of the particulate filter at a switching speed corresponding to an operation state of the engine. Therefore, if the switching speed is reduced when almost no particulates are included in low-temperature exhaust gas, for example, when the engine is being decelerated, it is possible to suppress a decrease in the temperature of the particulate filter without discharging particulates into the atmosphere. If the switching speed is increased when particulates are included in exhaust gas, it is possible to reduce the amount of particulates discharged into the atmosphere.

In the aforementioned second aspect, an active oxygen discharging agent may be carried on the collecting wall so that active oxygen discharged from the active oxygen discharging agent oxidizes particulates.

In the aforementioned second aspect, the active oxygen discharging agent may absorb and retain oxygen if there is an excessive amount of oxygen around, and discharge the retained oxygen in the form of active oxygen if the concentration of ambient oxygen decreases.

BRIEF DESCRIPTION OF THE DRAWINGS

FIG. 15 shows maps of the target opening degrees of the throttle valve and the like.

FIG. 17 shows the target opening degrees of the throttle valve and the like.

DETAILED DESCRIPTION OF PREFERRED EMBODIMENTS

Figure 1:
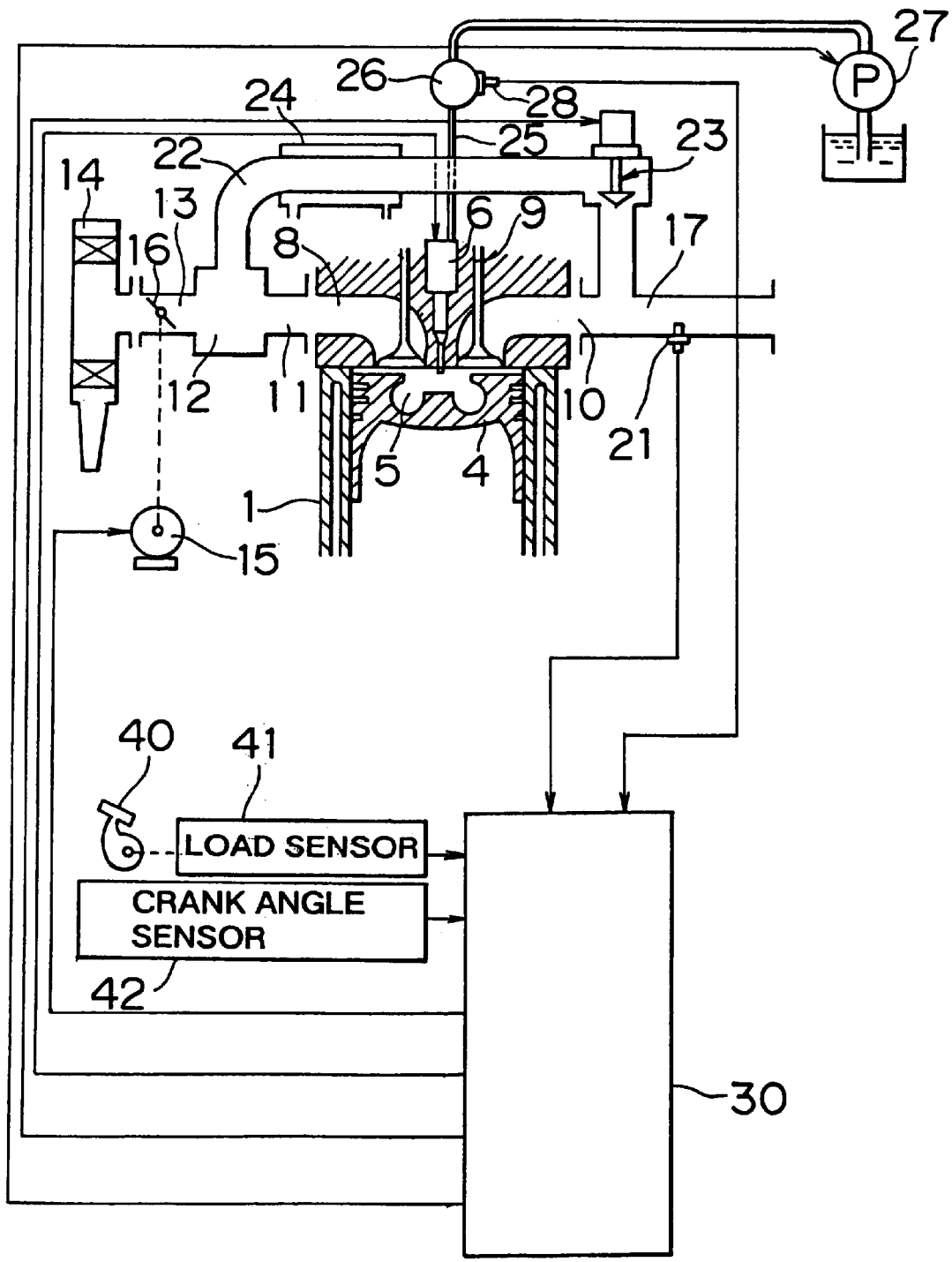
FIG. 1 is a schematic longitudinal cross-sectional view of a diesel engine having an exhaust gas purifier according to the invention.
Figure 2:
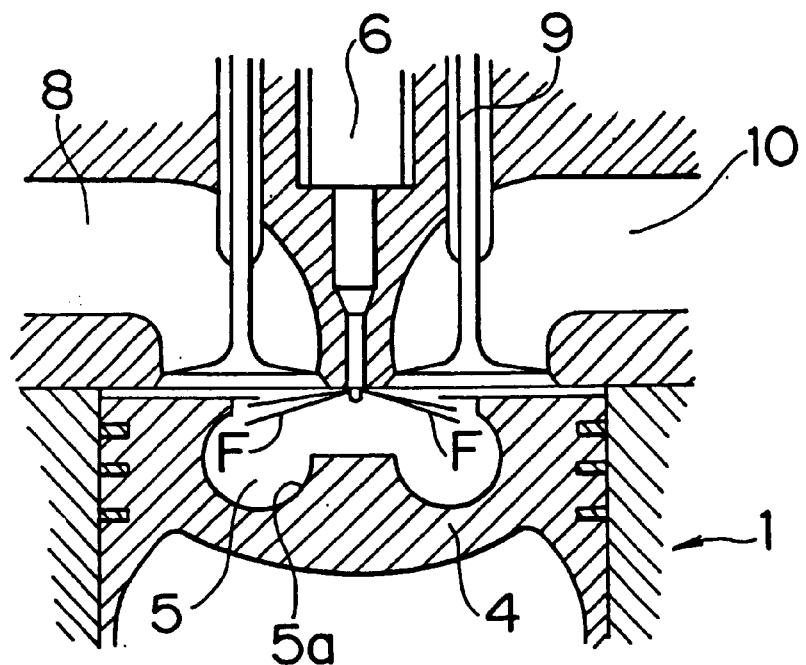
FIG. 2 is an enlarged longitudinal cross-sectional view of a combustion chamber shown in FIG. 1.
Figure 3:
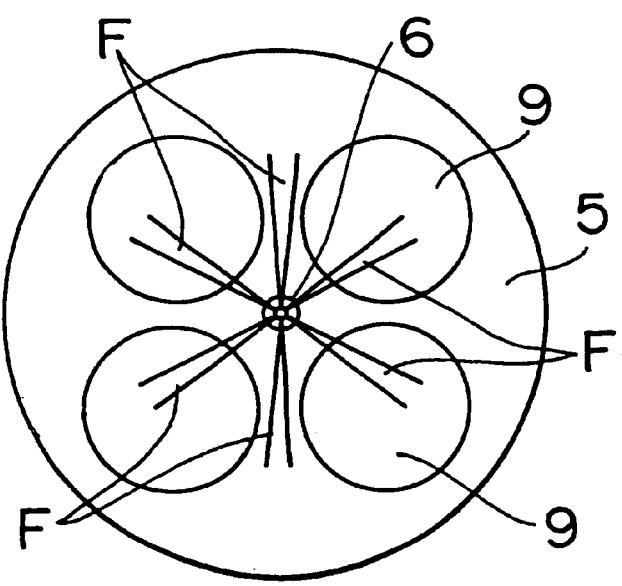
FIG. 3 is a bottom view of a cylinder head shown in FIG. 1.

FIG. 1 is a schematic longitudinal cross-sectional view of a four-stroke diesel engine having an exhaust gas purifier according to the invention. FIG. 2 is an enlarged longitudinal cross-sectional view of a combustion chamber of the diesel engine shown in FIG. 1. FIG. 3 is a bottom view of a cylinder head of the diesel engine shown in FIG. 1. Referring to FIGS. 1 through 3, an intake port 8 is coupled to a surge tank 12 through a relevant intake branch pipe 11, and the surge tank 12 is coupled to an air cleaner 14 through an intake duct 13. A throttle valve 16 driven by an electric motor 15 is disposed in an intake duct 18. On the other hand, an exhaust port 10 is connected to an exhaust manifold 17.

As shown in FIG. 1, an air-fuel ratio sensor 21 is disposed in the exhaust manifold 17. The exhaust manifold 17 and the surge tank 12 are coupled to each other through an EGR passage 22, and an electrically controlled EGR control valve 23 is disposed in the EGR passage 22. A cooling unit 24 is disposed around the EGR passage 22 to cool the EGR gas flowing through the EGR passage 22. In an embodiment shown in FIG. 1, engine coolant is introduced into the cooling unit 24 so that the EGR gas is cooled by the engine coolant.

On the other hand, each fuel injection valve 6 is coupled to a fuel reservoir, namely, a so-called common rail 26 through a fuel supply pipe 25. Fuel is supplied to the common rail 26 from an electrically controlled fuel pump 27 whose discharge amount is variable. The fuel supplied to the common rail 26 is supplied to the fuel injection valve 6 through each fuel supply pipe 25. A fuel pressure sensor 28 for detecting the fuel pressure in the common rail 26 is mounted to the common rail 26. Based on the output signal from the fuel pressure sensor 28, the discharge amount of the fuel pump 27 is controlled such that the fuel pressure in the common rail 26 becomes equal to a target fuel pressure.

The output signals from the air-fuel ratio sensor 21 and the fuel pressure sensor 28 are inputted to an electronic control unit 30. A load sensor 41 generating the output voltage proportional to the depression amount L of an accelerator pedal 40 is connected to the accelerator pedal 40. The output signal from the load sensor 41 is also inputted to the electronic control unit 30. Furthermore, the output signal from a crank angle sensor 42, which generates an output pulse every time a crank shaft rotates for example by 30° CA, is also inputted to the electronic control unit 30. Thus, the electronic control unit 30 operates the fuel injection valve 6, the electric motor 15, the EGR control valve 23 and the fuel pump 27 based on various signals. A ROM (not shown in figures) is built into the electronic control unit 30.

As shown in FIGS. 2, 3, in the embodiment according to the invention, the fuel injection valve 6 is constructed of a hole nozzle having six nozzle holes. Fuel sprays F are injected from the nozzle holes of the fuel injection valve 6 at equal angular intervals and slightly downwardly with respect to a horizontal plane. As shown in FIG. 3, two of the six fuel sprays F fly along the lower face of a valve body of each exhaust valve 9. FIGS. 2, 3 show fuel injection in the late stage of a compression stroke. At this moment, the fuel sprays F travel towards the inner periphery of a cavity 5a and are then ignited and burnt.

Figure 4:
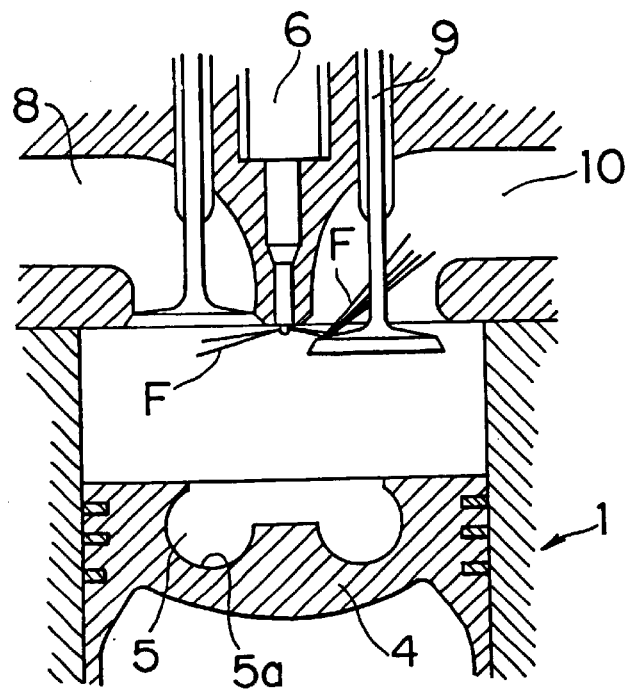
FIG. 4 is a side cross-sectional view of a combustion chamber.
Figure 5:
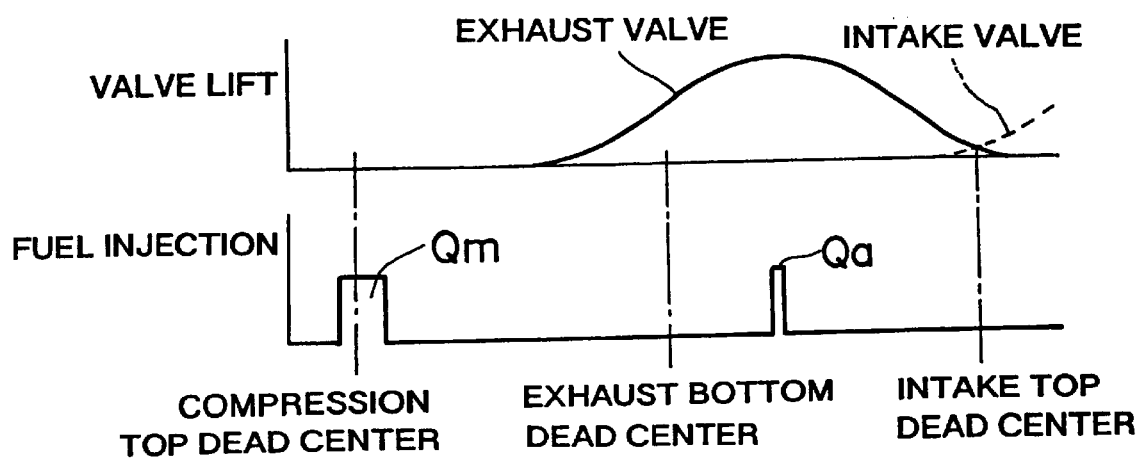
FIG. 5 shows the lifts of intake and exhaust valves and fuel injection.

FIG. 4 shows a case where additional fuel is injected from the fuel injection valve 6 when the lift of the exhaust valve 9 is at its maximum in an exhaust stroke. That is, as shown in FIG. 5, main injection Qm is carried out in the proximity of a compression top dead center and additional fuel Qa is then injected in the middle of an exhaust stroke. In this case, the fuel sprays F traveling in the direction of the valve body of the exhaust valve 9 head towards a space between the back face of the bevel of the exhaust valve 9 and the exhaust port 10. In other words, two of the six nozzle holes of the fuel injection valve 6 are configured such that the fuel sprays F head towards the space between the back face of the bevel of the exhaust valve 9 and the exhaust port 10 upon injection of the additional fuel Qa when the exhaust valve 9 is open. In the embodiment shown in FIG. 4, the fuel sprays F then hit the back face of the bevel of the exhaust valve 9, are reflected thereby, and head towards the exhaust port 10.

Figure 6:
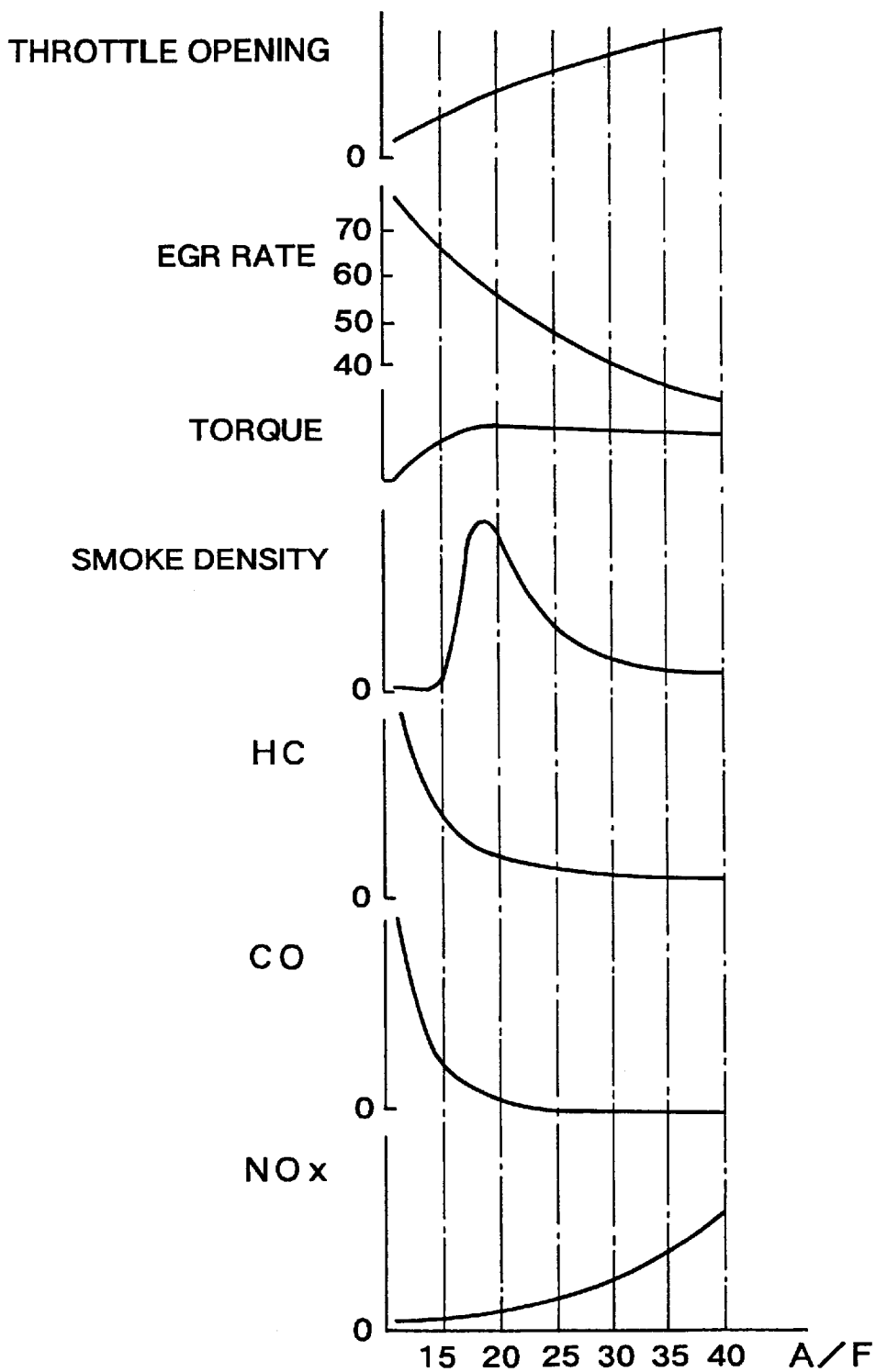
FIG. 6 mainly shows the generation amounts of smoke and $NO_x$.

Normally, the additional fuel Qa is not injected, and only main injection Qm is carried out. FIG. 6 shows an experimental example indicative of changes in the output torque and changes in the discharge amounts of smoke, HC, CO and NOx when the air-fuel ratio A/F (the axis of abscissa in FIG. 6) is changed by changing the opening degree of the throttle valve 16 and the EGR rate. As is apparent from FIG. 6, this experimental example demonstrates that the EGR rate increases with decreases in the air-fuel ratio A/F and that the EGR rate is equal to or higher than 65% when the air-fuel ratio is equal to or lower than the stoichiometric air-fuel ratio ($\approx$14.6).

If the air-fuel ratio A/F is reduced by increasing the EGR rate as shown in FIG. 6, the generation amount of smoke starts increasing when the EGR rate approaches 40% and the air-fuel ratio A/F reaches approximately 30. Then if the EGR rate is further enhanced to reduce the air-fuel ratio A/F, the generation amount of smoke increases abruptly and reaches its peak. Then if the EGR rate is further enhanced to reduce the air-fuel ratio A/F, the generation amount of smoke decreases abruptly and becomes approximately equal to zero when the EGR rate becomes equal to or higher than 65% and the air-fuel ratio A/F approaches 15.0. In other words, hardly no smoke is generated. At this moment, the main torque of the engine decreases slightly and the generation amount of $NO_x$ becomes considerably small. On the other hand, at this moment, the generation amounts of HC and CO start increasing.

Figure 7A:
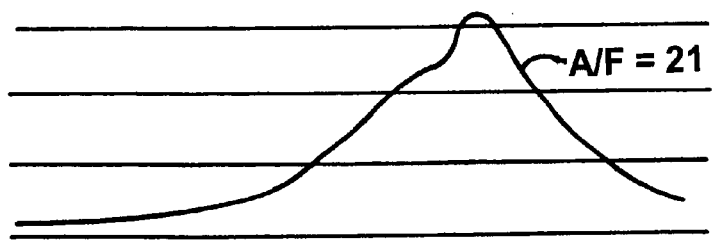
FIG. 7 shows combustion pressures.
Figure 7B:
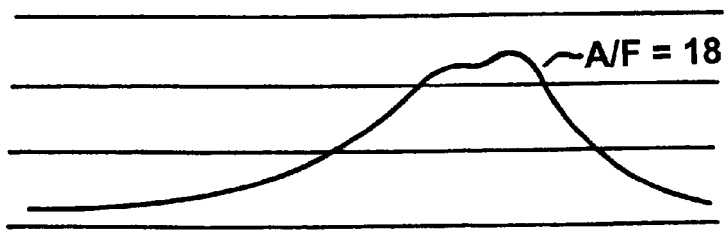

FIG. 7A shows changes in the combustion pressure in the combustion chamber 5 when the air-fuel ratio A/F is close to 21 and the generation amount of smoke is at its maximum. FIG. 7B shows changes in the combustion pressure in the combustion chamber 5 when the air-fuel ratio A/F is close to 18 and the generation amount of smoke i s approximately equal to zero. A comparison between FIG. 7A and FIG. 7B reveals that the combustion pressure in the case where the generation amount of smoke is approximately pressure in the case where the generation amount of smoke is great as shown in FIG. 7A.

The following conclusion can be derived from the experimental results shown in FIGS. 6, 7. First of all, as shown in FIG. 6, the generation amount of $NO_x$ decreases considerably when the air-fuel ratio A/F is equal to or lower than 15.0 and the generation amount of smoke is approximately equal to zero. The decrease in the generation amount of $NO_x$ means that the combustion temperature in the combustion chamber 5 has decreased. Accordingly, it is possible to conclude that the combustion temperature in the combustion chamber 5 is low when hardly no soot is generated. The same conclusion can be derived from FIG. 7. That is, the combustion pressure is low when hardly no soot is generated as shown in FIG. 7B. Accordingly, it is possible to conclude that the combustion temperature in the combustion chamber 5 is low.

Figure 8:
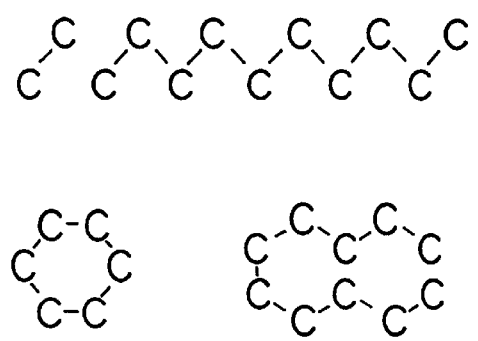
FIG. 8 shows fuel molecules.

Secondly, as shown in FIG. 6, the discharge amounts of HC and CO increase if the generation amount of smoke, namely, the generation amount of soot becomes approximately equal to zero. This means that hydrocarbons are discharged without growing into soot. That is, if the temperature is raised in the state of a deficiency of oxygen, the straight-chain hydrocarbons and aromatic hydrocarbons included in fuel as shown in FIG. 8 are thermally decomposed. As a result, the precursor of soot is formed and the soot mainly composed of a solid agglomeration of carbon atoms is produced. In this case, the actual process of producing soot is complicated and it is unclear what configuration the precursor of soot assumes. In any case, the hydrocarbons as shown in FIG. 8 grow into soot through its precursor. Thus, as described above, if the generation amount of soot becomes approximately equal to zero, the discharge amounts of HC and CO increase as shown in FIG. 6. At this moment, the HC is the precursor of soot or a hydrocarbon that has not grown into the precursor of soot.

The summarization of these considerations based on the experimental results shown in FIGS. 6, 7 demonstrates that the generation amount of soot is approximately equal to zero when the combustion temperature in the combustion chamber 5 is low and that the combustion chamber 5 discharges the precursor of soot or the hydrocarbons that have not grown into the precursor of soot at this moment. Minutely detailed experiments and studies on this subject have revealed that the growing process of soot is stopped before its completion, namely, no soot is generated if the temperature of fuel and ambient gas in the combustion chamber 5 is equal to or lower than a certain temperature, and that soot is produced if the temperature of fuel and ambient gas becomes higher than the aforementioned certain temperature.

When the growing process of hydrocarbons is stopped in the state of the precursor of soot, the temperature of fuel and ambient gas and the aforementioned certain temperature change depending on various factors such as the type of fuel, the air-fuel ratio and the compression ratio, and therefore cannot be determined specifically. However, the certain temperature has a close relation to the generation amount of $NO_x$ and therefore can be estimated from the generation amount of $NO_x$ to a certain extent. In other words, the temperature of fuel and ambient gas at the time of combustion decreases and the generation amount of $NO_x$ decreases as the EGR rate increases. Hardly no soot is generated if the generation amount of $NO_x$ becomes approximately equal to or smaller than 10 p.p.m. Accordingly, the aforementioned certain temperature substantially coincides with the temperature at the time when the generation amount of $NO_x$ is approximately equal to or smaller than 10 p.p.m.

Once soot has been produced, the soot cannot be purified by an after-treatment using a catalyst having an oxidative function. On the contrary, the precursor of soot or the hydrocarbons that have not grown into the precursor of soot can be purified easily by an after-treatment using a catalyst having an oxidative function. Thus, the reduction of the generation amount of $NO_x$ and the discharging of the hydrocarbon carbons that have or have not grown into the precursor of soot from the combustion chamber 5 are highly effective in purifying exhaust gas.

In order to stop the growth of hydrocarbons before the production of soot, it is necessary to maintain the temperature of fuel and ambient gas in the combustion chamber at the time of combustion lower than a temperature where soot is produced. It has been revealed in this case that the endothermic effect of the gas surrounding fuel during its combustion crucially affects the reduction of the temperature of fuel and ambient gas.

That is, fuel vapors immediately react with the oxygen included in the air and burn if there is nothing but air around fuel. In this case, the temperature of the air distant from fuel does not rise substantially, and only the temperature around fuel locally rises to a considerable extent. That is, the air distant from fuel hardly exerts the endothermic effect of the combustion heat of fuel at this moment. In this case, since the combustion temperature locally rises to a considerable extent, the unburnt hydrocarbons that have received the combustion heat produce soot.

On the other hand, the circumstances are slightly different if there is fuel in the mixture gas composed of a great amount of inactive gas and air. In this case, fuel vapors are diffused around, react with the oxygen mixed into inactive gas, and burn. In this case, since ambient inactive gas absorbs the combustion heat, the combustion temperature does not rise appreciably. Namely, it is possible to keep the combustion temperature low. In other words, the presence of inactive gas plays an important role in reducing the combustion temperature and the endothermic effect of inactive gas makes it possible to keep the combustion temperature low.

In this case, the maintaining of the temperature of fuel and ambient gas lower than a temperature where soot is produced requires such an amount of inactive gas that can absorb heat sufficiently. Accordingly, the required amount of inactive gas increases as the amount of fuel increases. In this case, the endothermic effect is strengthened in proportion to the specific heat of inactive gas. Thus, it is preferable to use inactive gas with a great specific heat. In this respect, since $CO_2$ and EGR gas have a relatively great specific heat, it is possible to conclude that EGR gas can be desirably used as inactive gas.

Figure 9:
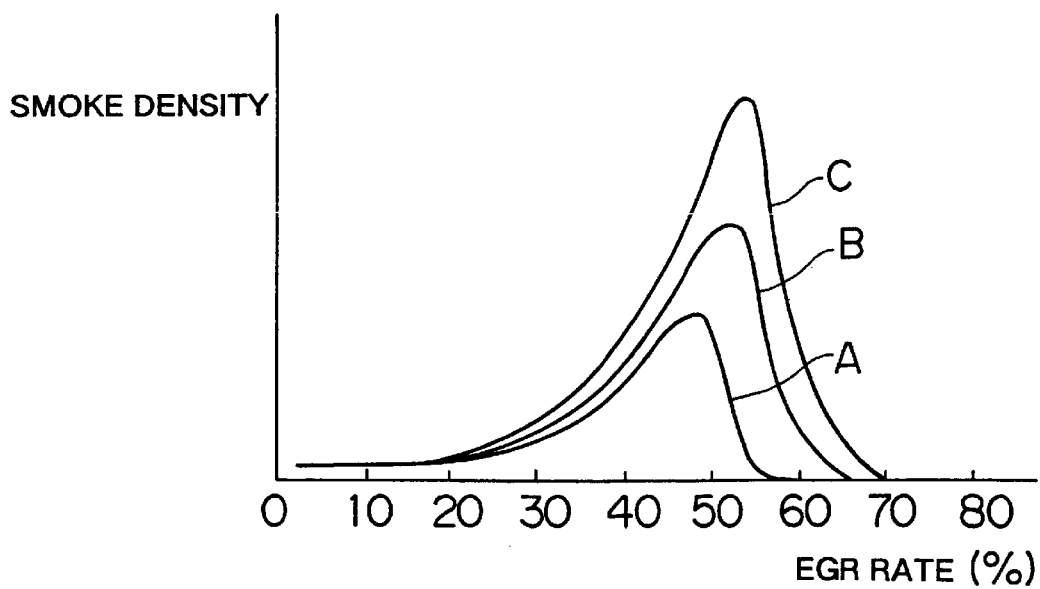
FIG. 9 shows the relation between generation amounts of smoke and EGR rates.

FIG. 9 shows the relation between EGR rates and generation amounts of smoke when EGR gas is used as inactive gas and the cooling degree of EGR gas is changed. FIG. 9 shows curves A, B and C. The curve A indicates a case where the temperature of EGR gas is maintained approximately at 90° C. by intensively cooling EGR gas. The curve B indicates a case where EGR gas is cooled by a compact cooling unit. The curve C indicates a case where EGR is not cooled forcibly.

If EGR gas is cooled intensively as indicated by the curve A shown in FIG. 9, the generation amount of soot reaches its peak when the EGR rate is slightly lower than 50%. In this case, hardly no soot is generated if the EGR rate is made approximately equal to or higher than 55%.

On the other hand, if EGR gas is cooled slightly as indicated by the curve B shown in FIG. 9, the generation amount of soot reaches its peak when the EGR rate is slightly higher than 50%. In this case, hardly no soot is generated if the EGR rate is made approximately equal to or higher than 65%.

Further, if EGR gas is not cooled forcibly as indicated by the curve C shown in FIG. 9, the generation amount of smoke reaches its peak when the EGR rate is close to 55%. In this case, hardly no soot is generated if the EGR rate is made approximately equal to or higher than 70%.

FIG. 9 shows the generation amounts of smoke when the engine load is relatively high. If the engine load lowers, the EGR rate where the generation amount of soot reaches its peak decreases slightly, and the lower limit of the EGR rate where hardly no soot is generated also decreases slightly. The lower limit of the EGR rate where hardly no soot is generated changes depending on the cooling degree of EGR gas and the engine load.

Figure 10:
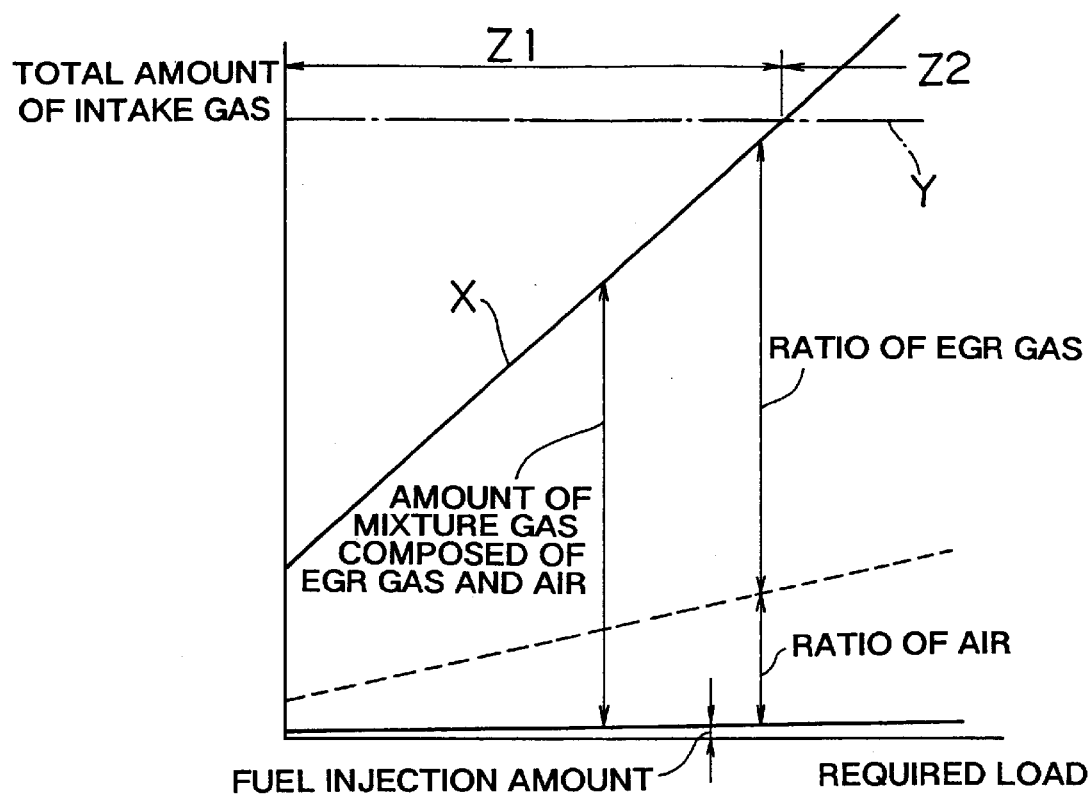
FIG. 10 shows the relation between fuel injection amounts and amounts of mixture gas.

FIG. 10 shows the amount of the mixture gas composed of EGR gas and air required for maintaining the temperature of fuel and ambient gas lower than a temperature where soot is produced, the ratio of air to the mixture gas, and the ratio of EGR gas to the mixture gas, in the case where EGR gas is used as inactive gas. In FIG. 10, the axis of ordinate represents the total amount of the intake gas that can be sucked into the combustion chamber 5, and a chain line Y represents the total amount of the intake gas that can be sucked into the combustion chamber 5 when the supercharging operation is not performed. The axis of abscissa represents the required load and Z1 represents a low-load operation range.

Referring to FIG. 10, the ratio of air, namely, the amount of air in mixed gas indicates the amount of air required for complete combustion of injected fuel. Namely, in the case shown in FIG. 10, the ratio of the amount of air to the amount of injected fuel is equal to the stoichiometric air-fuel ratio. On the other hand, referring to FIG. 10, the ratio of EGR gas, namely, the amount of EGR gas in mixture gas indicates the minimum amount of EGR gas required for maintaining the temperature of fuel and ambient gas lower than a temperature where soot is formed, during combustion of injected fuel. This minimum required amount of EGR gas corresponds to the EGR rate that is approximately equal to or higher than 55%. In the embodiment shown in FIG. 10, the EGR rate is equal to or higher than 70%. That is, if it is assumed that the total amount of the intake gas sucked into the combustion chamber 5 is indicated by a solid line X shown in FIG. 10 and that the ratios of the amount of air and the amount of EGR gas to the total amount of intake gas X are as shown in FIG. 10, the temperature of fuel and ambient gas is lower than a temperature where soot is produced. Consequently, no soot is generated. The generation amount of $NO_x$ at this moment is approximately equal to or smaller than 10 p.p.m and is therefore considerably small.

Because the heat release value at the time of combustion of fuel increases if the amount of injected fuel increases, the amount of heat absorbed by EGR gas needs to be increased in order to maintain the temperature of fuel and ambient gas lower than a temperature where soot is produced. Thus, as shown in FIG. 10, the amount of EGR gas needs to be increased as the amount of injected fuel increases. In other words, the amount of EGR gas needs to be increased as the required load increases.

On the other hand, in a load range Z2 shown in FIG. 10, the total amount X of the intake gas required for preventing the generation of soot exceeds the total amount Y of the intake gas that can be sucked. Accordingly, in this case, for the purpose of supplying the combustion chamber 5 with the total amount X of the intake gas required for preventing the generation of soot, it is necessary to supercharge or pressurize both EGR gas and intake air or simply EGR gas. If EGR gas and the like are not supercharged or pressurized, the total amount X of intake gas coincides with the total amount Y of the intake gas that can be sucked in the load range Z2. Thus, in this case, prevention of the generation of soot requires slightly reducing the amount of air, increasing the amount of EGR gas, and burning fuel at a rich air-fuel ratio. As described above, FIG. 10 shows a case where fuel is burnt at the stoichiometric air-fuel ratio. In a low-load operation range Z1 shown in FIG. 10, even if the amount of air is made smaller than that shown in FIG. 10, namely, even if the air-fuel ratio is made rich, it is possible to keep the generation amount of $NO_x$ approximately equal to or smaller than 10 p.p.m while preventing the generation of soot. In the low-load range Z1 shown in FIG. 10, even if the amount of air is made greater than that shown in FIG. 10, namely, even if the average air-fuel ratio is made equal to a lean air-fuel ratio of 17 to 18, it is possible to keep the generation amount of NO approximately equal to or smaller than 10 p.p.m while preventing the generation of soot.

That is, the amount of fuel becomes excessive if the air-fuel ratio is made rich. However, since the combustion temperature is kept low, the excessive fuel does not grow into soot. Consequently, no soot is produced. At this moment, the generation amount of $NO_x$ is also considerably small. On the other hand, a small amount of soot is produced in response to a rise in the combustion temperature when the average air-fuel ratio is lean or when the air-fuel ratio is equal to the stoichiometric air-fuel ratio. However, according to the invention, since the combustion temperature is kept low, no soot Is generated. Furthermore, the generation amount of $NO_x$ is also considerably small.

Thus, no soot is generated in the engine low-load operation range Z1 regardless of the air-fuel ratio, namely, whether the air-fuel ratio is rich or equal to the stoichiometric air-fuel ratio, or whether the average air-fuel ratio is lean. That is, the generation amount of $NO_x$ is considerably small. Accordingly, from the standpoint of enhancement of the fuel consumption rate, it is preferable to keep the average air-fuel ratio lean.

The temperature of fuel and ambient gas at the time of combustion in the combustion chamber can be made equal to or lower than a temperature where the growth of hydrocarbons is stopped en route, only when the heat release value resulting from combustion is small, namely, when the engine load is relatively low. Thus, in the embodiment according to the invention, first combustion, namely, low-temperature combustion is carried out by maintaining the temperature of fuel and ambient gas at the time of combustion equal to or lower than a temperature where the growth of hydrocarbons is stopped en route when the engine load is relatively low, and second combustion, namely, conventional combustion is carried out when the engine load is relatively high.

As is apparent from the foregoing description, the first combustion, namely, the low-temperature combustion refers to combustion of a type wherein the amount of inactive gas in the combustion chamber is greater than a most inappropriate amount of inactive gas corresponding to a maximum generation amount of soot and wherein hardly no soot is generated, and the second combustion, namely, the conventional combustion refers to combustion of a type wherein the amount of inactive gas in the combustion chamber is smaller than a most inappropriate amount of inactive gas corresponding to a maximum generation amount of soot.

Figure 11:
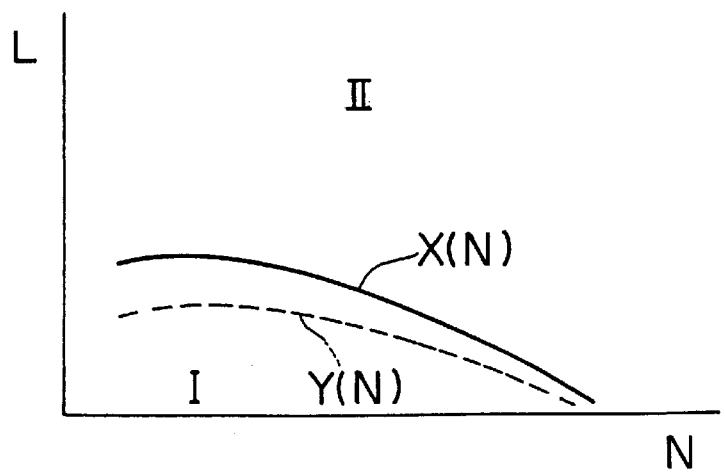
FIG. 11 shows a first operation range I and a second operation range II.

FIG. 11 shows a first operation range I where the first combustion, namely, the low-temperature combustion is carried out and a second operation range II where the second combustion, namely, the conventional combustion is carried out. In FIG. 11, the axis of ordinate L represents the depression amount of the accelerator pedal 40, namely, the required load, and the axis of abscissa N represents the engine speed. In FIG. 11, X(N) represents a first border between the first operation range I and the second operation range II, and Y(N) represents a second border between the first operation range I and the second operation range II. A shift of the operation range from the first operation range I to the second operation range II is judged based on the first border X(N), and a shift of the operation range from the second operation range II to the first operation range I is judged based on the second border (N).

That is, if the required load L exceeds the first border X(N) expressed as a function of the engine speed N when the low-temperature combustion is carried out with the engine in the first operation range I, it is judged that the operation range has shifted to the second operation range II, and the conventional combustion is carried out. If the required load L drops below the second border Y(N) expressed as a function of the engine speed N, it is judged that the operation range has shifted to the first operation range I, and the low-temperature combustion is carried out again.

Figure 12:
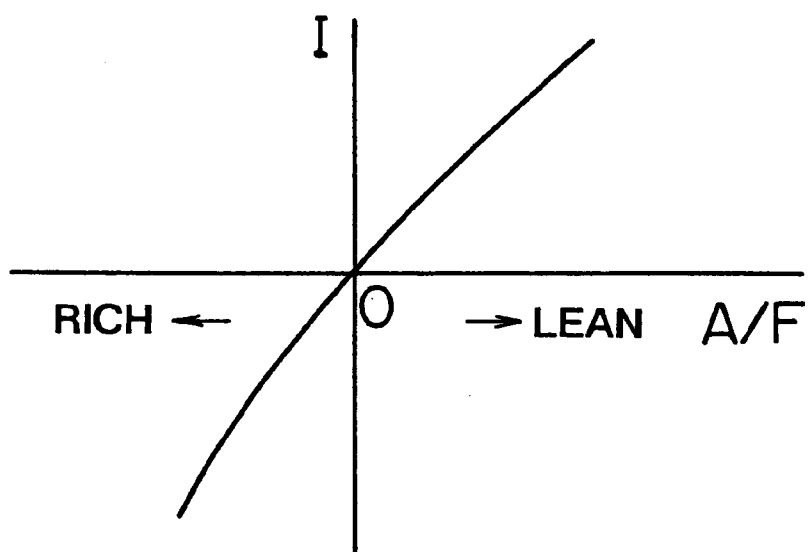
FIG. 12 shows the outputs of an air-fuel ratio sensor.
Figure 13:
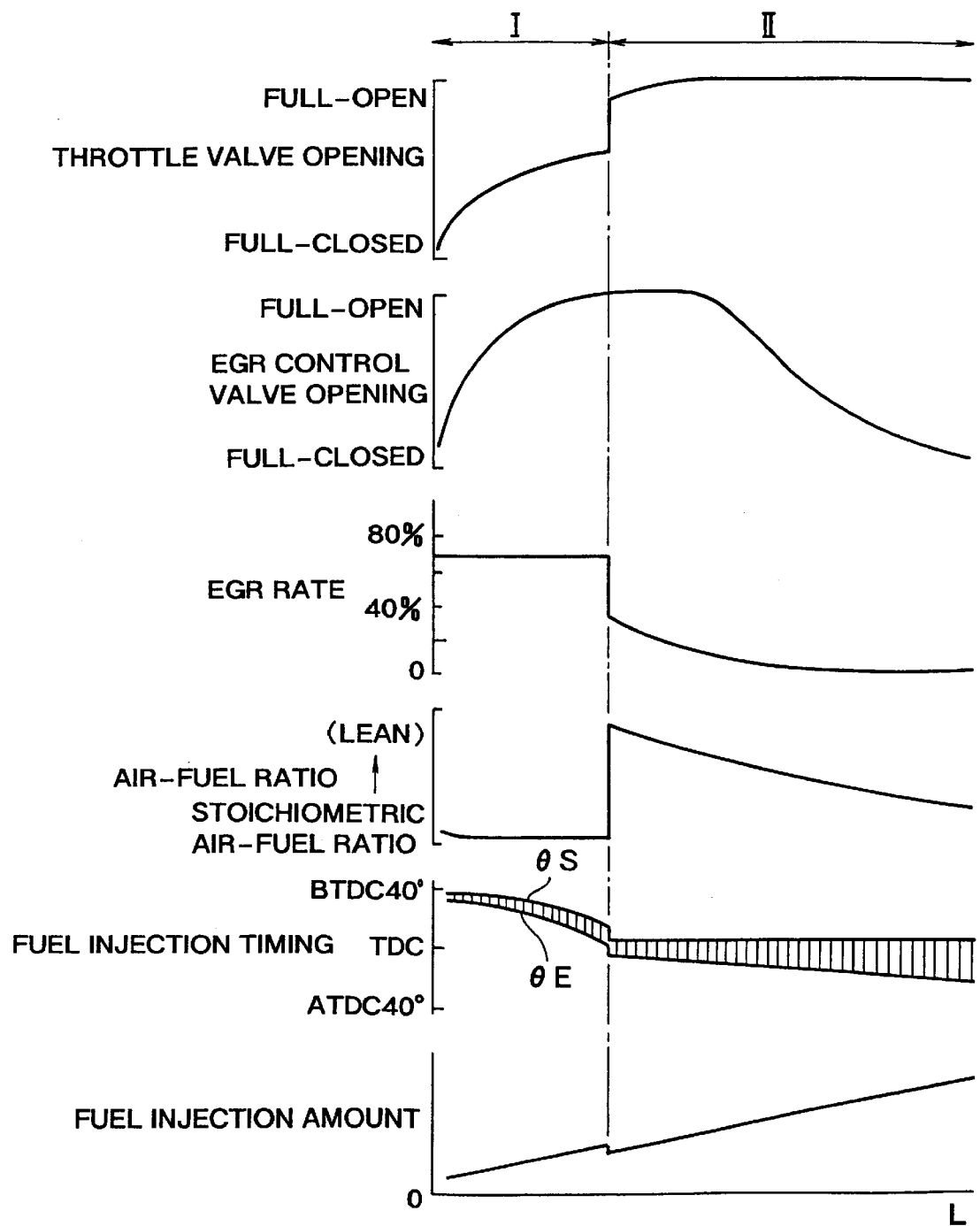
FIG. 13 mainly shows the opening degrees of a throttle valve.

FIG. 12 shows the outputs of the air-fuel ratio sensor 21. As shown in FIG. 12, the output current I of the air-fuel ratio sensor 21 changes in accordance with the air-fuel ratio A/F. Thus it is possible to detect an air-fuel ratio from the output current I of the air-fuel ratio sensor 21. Referring next to FIG. 13, the outline of operation control in the first operation range I and the second operation range II will be described.

FIG. 13 shows how the opening degree of the throttle valve 16, the opening degree of the EGR control valve 23, the EGR rate, the air-fuel ratio, the injection timing and the injection amount change as the required load L changes. As shown in FIG. 13, in the first operation range I where the required load L is low, the opening degree of the throttle valve 16 gradually increases approximately from its full-closed state to its half-open state as the required load L increases, and the opening degree of the EGR control valve 23 gradually increases approximately from its full-closed state to its full-open state as the required load L increases. In the example shown in FIG. 13, in the first operation range I, the EGR rate is approximately equal to 70%, and the air-fuel ratio is slightly lean.

In other words, in the first operation range, the opening degrees of the throttle valve 16 and the EGR control valve 23 are controlled such that the EGR rate becomes approximately equal to 70% and that the air-fuel ratio becomes slightly lean. At this moment, the air-fuel ratio is controlled to a target lean air-fuel ratio by correcting the opening degree of the EGR control valve 23 based on the output signal from the air-fuel ratio sensor 21. In the first operation range I, fuel injection is carried out before a compression top dead center TDC. In this case, the injection start timing θS is retarded as the required load L increases. The injection end timing θE is also retarded as the injection start timing θS is retarded.

During idling operation, the throttle valve 16 is opened approximately to its full-open state and the EGR control valve 23 is also closed approximately to its full-closed state. If the throttle valve 16 is closed approximately to its full-close state, the pressure in the combustion chamber 5 at the beginning of compression decreases, and therefore, the compression pressure decreases. If the compression pressure decreases, the compression work done by a piston 4 decreases, and therefore, the oscillation of an engine body 1 decreases. That is, during idling operation, the throttle valve 16 is closed approximately to its full-closed state to damp the oscillation of the engine body 1.

On the other hand, if the operation range of the engine shifts from the first operation range I to the second operation range II, the opening degree of the throttle valve 16 is increased stepwise from its half-open state toward its full-open state. At this moment, in the example shown in FIG. 13, the EGR rate is reduced stepwise approximately from 70% to 40% or less, and the air-fuel ratio is increased stepwise. That is, since the EGR rate exceeds an EGR rate range (FIG. 9) where a great amount of smoke is generated, a shift of the operation range of the engine from the first operation range I to the second operation range II does not cause generation of a great amount of smoke.

In the second operation range II, the conventional combustion is carried out. The conventional combustion causes generation of a small amount of soot and $NO_x$ but is higher in thermal efficiency than the low-temperature combustion. Thus, if the operation of the engine is shifted from the first operation range I to the second operation range II, the injection amount is reduced stepwise as shown in FIG. 13.

In the second operation range II, the throttle valve 16 is mostly maintained in its full-open state, and the opening degree of the EGR control valve 23 is gradually reduced as the required load L is increased. In the operation range II, the EGR rate decreases as the required load L increases, and the air-fuel ratio decreases as the required load L increases. However, the air-fuel ratio remains lean even if the required load L has increased. In the second operation range II, the injection start timing θS is in the proximity of the compression top dead center TDC.

Figure 14:
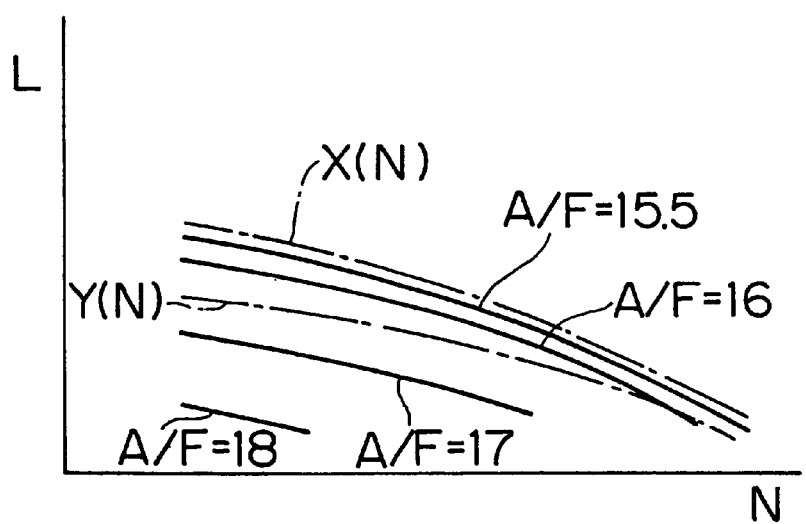
FIG. 14 shows the air-fuel ratios in the first operation range I.

FIG. 14 shows the air-fuel ratios A/F in the first operation range I. In FIG. 14, curves marked with A/F=15.5, A/F=16, A/F=17 and A/F=18 indicate that the air-fuel ratio is equal to 15.5, 16, 17 and 18 respectively, and the air-fuel ratios among the curves are determined by proportional distribution. As shown in FIG. 14, the air-fuel ratio is lean in the first operation range I, and the air-fuel ratio A/F becomes leaner as the required load L decreases in the first operation range I.

That is, the heat release value resulting from combustion decreases as the required load L decreases. Thus, as the required load L decreases, the possibility of carrying out the low-temperature combustion increases even if the EGR rate has been reduced. The air-fuel ratio increases if the EGR rate is reduced. Thus, as shown in FIG. 14, the air-fuel ratio A/F is increased as the required load L decreases. The fuel consumption rate is enhanced as the air-fuel ratio A/F increases. Accordingly, in this embodiment, in order to make the air-fuel ratio as lean as possible, the air-fuel ratio A/F is increased as the required load L decreases.

Figure 15A:
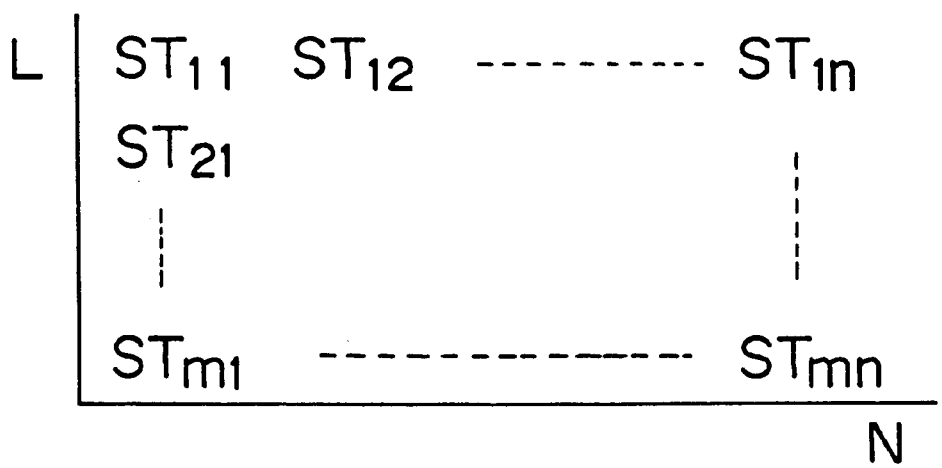
Figure 15B:
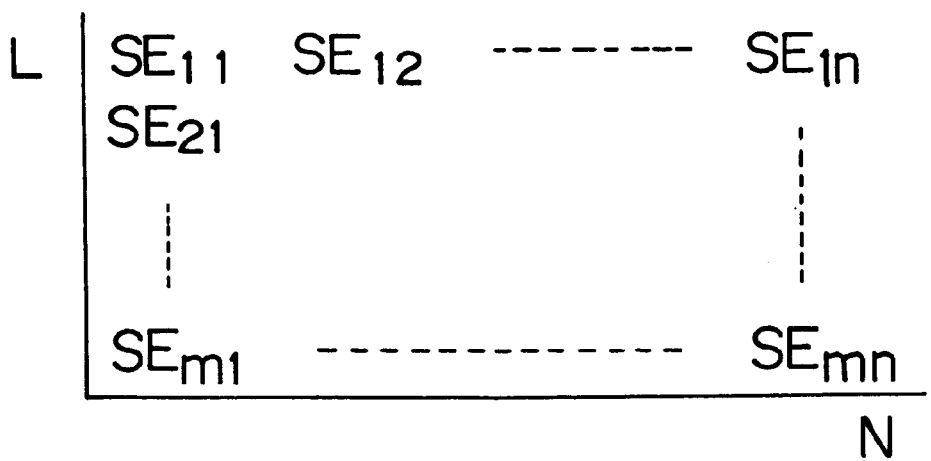

The target opening degrees ST of the throttle valve 16 required for making the air-fuel ratio equal to the target air-fuel ratios shown in FIG. 14 are stored in advance in the ROM in the form of a map as a function of the required load L and the engine speed N as shown in FIG. 15A. The target opening degrees SE of the EGR control valve 23 required for making the air-fuel ratio equal to the target air-fuel ratios shown in FIG. 14 are stored in advance in the ROM in the form of a map as a function of the required load L and the engine speed N as shown in FIG. 15B.

Figure 16:
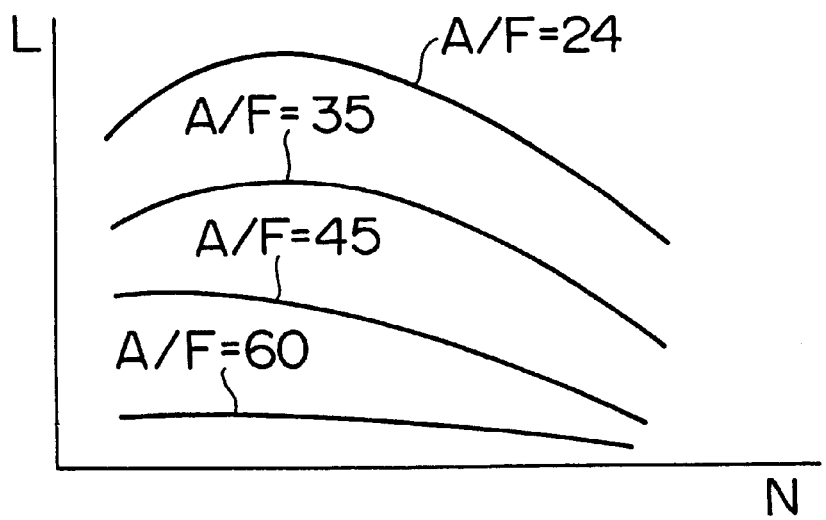
FIG. 16 shows the air-fuel ratios in the second operation range II.
Figure 17A:
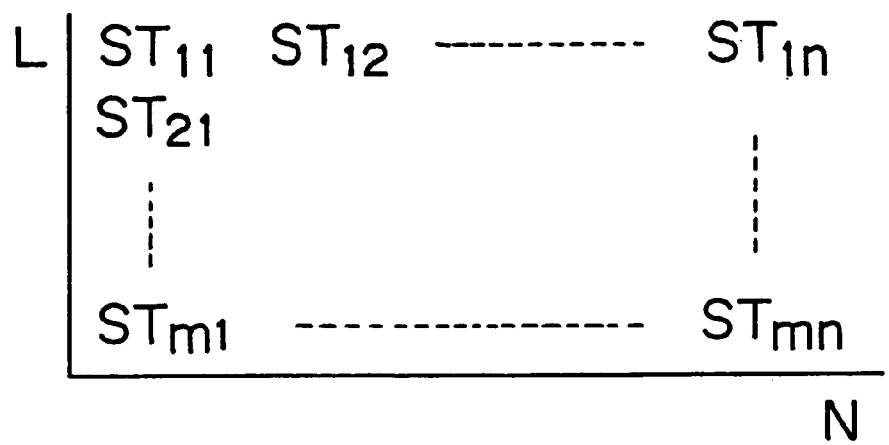
Figure 17B:
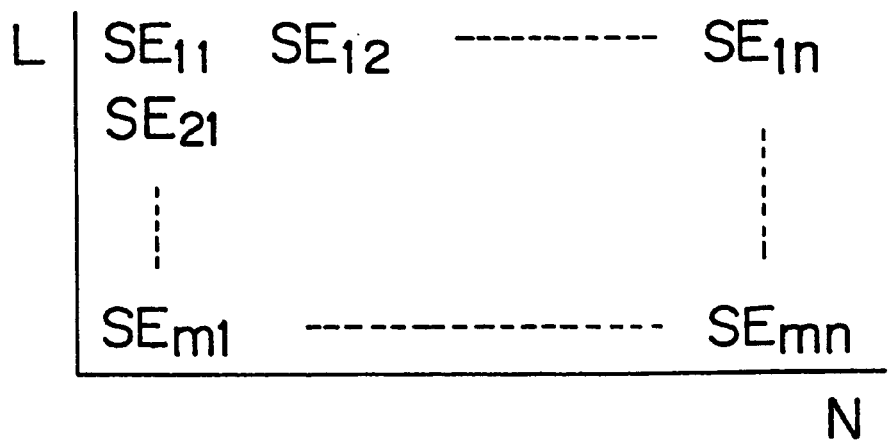

FIG. 16 shows the target air-fuel ratios during the second combustion, namely, the conventional combustion. In FIG. 16, curves marked with A/F=24, A/F=35, A/F=45 and A/F=60 indicate that the air-fuel ratio is equal to 24, 35, 45 and 60 respectively. The target opening degrees ST of the throttle valve 16 required for making the air-fuel ratio equal to the target air-fuel ratios are stored in advance in the ROM in the form of a map as a function of the required load L and the engine speed N as shown in FIG. 17A. The target opening degrees SE of the EGR control valve 23 required for making the air-fuel ratio equal to the target air-fuel ratios are stored in advance in the ROM in the form of a map as a function of the required load L and the engine speed N as shown in FIG. 17B.

Thus, the operation of the diesel engine according to this embodiment is switched between the first combustion, namely, the low-temperature combustion and the second combustion, namely, the conventional combustion based on the depression amount L of the accelerator pedal 40 and the engine speed N. During each of the first combustion and the second combustion, based on the depression amount L of the accelerator pedal 40 and the engine speed N, the opening degrees of the throttle valve 16 and the EGR valve are controlled with reference to the map shown in FIG. 15 or FIG. 17.

Figure 18:
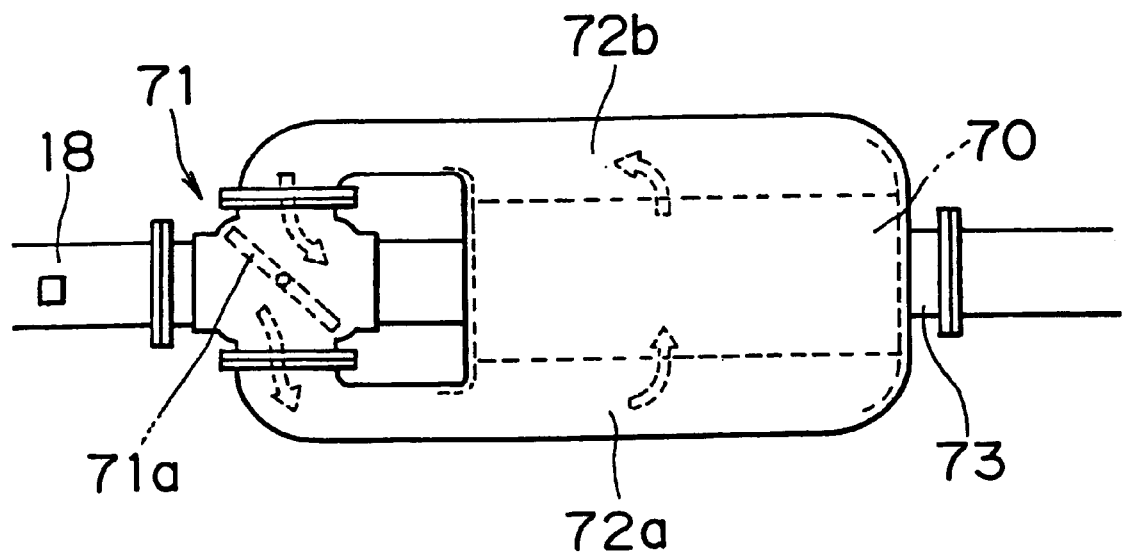
FIG. 18 is a plan view in the proximity of a particulate filter and a change-over portion in an engine exhaust system.
Figure 19:
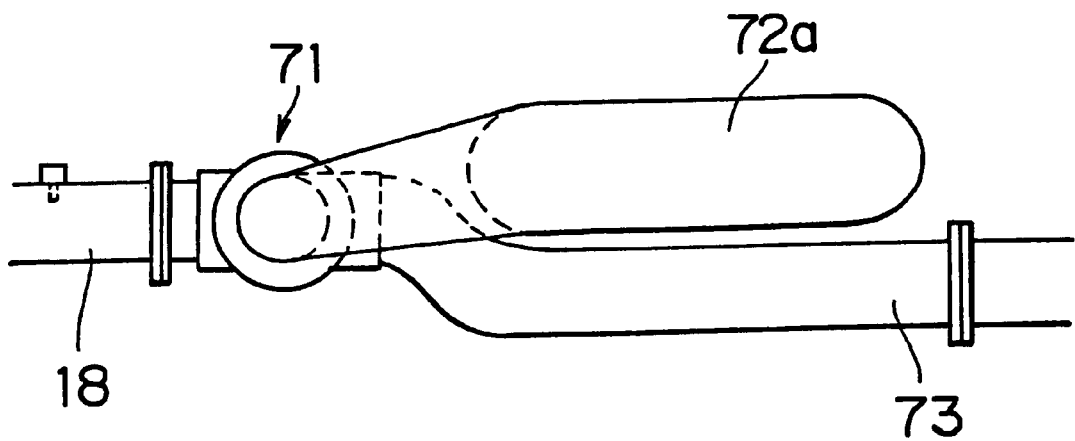
FIG. 19 is a side view of FIG. 18.

FIG. 18 is a plan view of an exhaust gas purifier. FIG. 19 is a side view of the exhaust gas purifier. The exhaust gas purifier has a change-over portion 71 connected to the downstream side of the exhaust manifold 17 through an exhaust pipe 18, a particulate filter 70, a first connecting portion 72a for connecting one side of the particulate filter 70 to the change-over portion 71, a second connecting portion 72b for connecting the other side of the particulate filter 70 to the change-over portion 71, and an exhaust passage 73 downstream of the change-over portion 71. The change-over portion 71 has a valve body 71a, which can block the flow of exhaust gas in the change-over portion 71. The valve body 71a is driven by a negative-pressure actuator, a step motor or the like. When the valve body 71a assumes its first block position, the upstream side of the change-over portion 71 communicates with the first connecting portion 72a, and the downstream side of the change-over portion 71 communicates with the second connecting portion 72b. In this state, exhaust gas flows from one side to the other side of the particulate filter 70 as indicated by arrows in FIG. 18.

Figure 20:
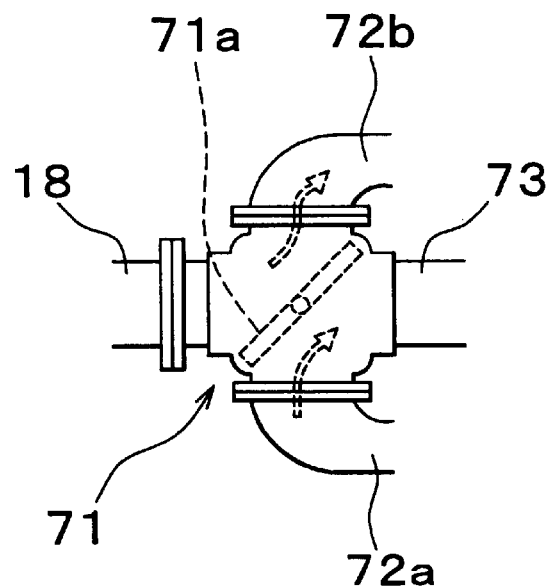
FIG. 20 shows another block position of a valve body in the change-over portion, the block position being different from the position shown in FIG. 18.

FIG. 20 shows a second block position of the valve body 71a. When the upstream side of the change-over portion 71 communicates with the second connecting portion 72b, and the downstream side of the change-over portion 71 communicates with the first connecting portion 72a. In this state, exhaust gas flows from the other side to one side of the particulate filter 70 as indicated by arrows in FIG. 20. Thus, by switching the valve body 71a from one of the first and second block positions to the other, it becomes possible to reverse the direction of the exhaust gas flowing into the particulate filter 70, namely, to reverse the upstream and downstream sides of the particulate filter 70.

In this manner, the exhaust gas purifier according to the invention makes it possible to reverse the upstream and downstream sides of a particulate filter with a fairly simple structure. The particulate filter requires a great opening area to ensure that exhaust gas can easily flow thereinto. In the exhaust gas purifier according to the invention, it is possible to employ a particulate filter having a great opening area as shown in FIGS. 18, 19 without adversely affecting the mountability to the vehicle.

Figure 21:
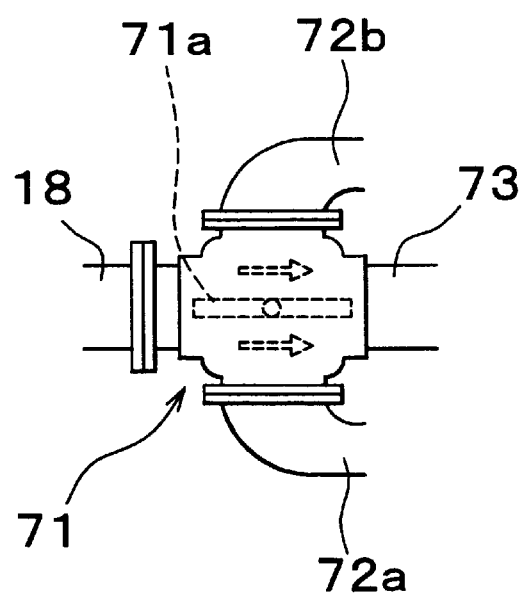
FIG. 21 shows an open position of the valve body in the change-over portion.

On the other hand, in the exhaust gas purifier according to the invention, while the valve body 71a is rotated from one of the first and second block positions to the other with a view to reversing the upstream and downstream sides of the particulate filter, exhaust gas is discharged into the atmosphere without passing through the particulate filter as shown in FIG. 21.

Figure 22A:
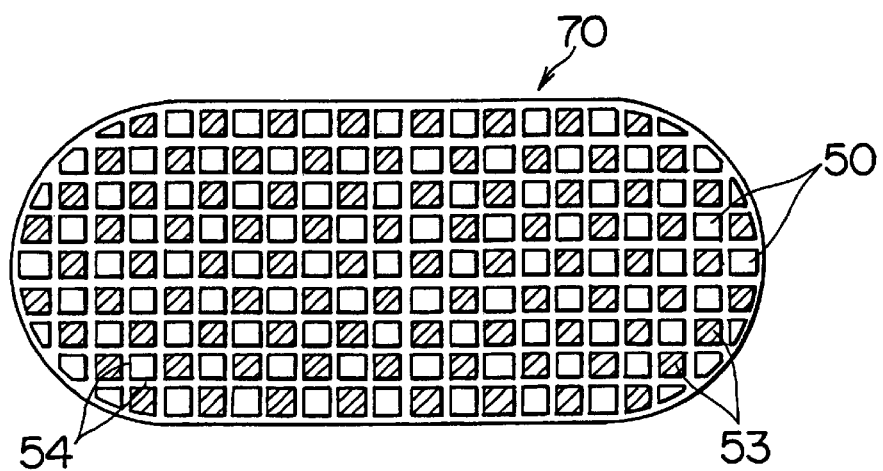
FIG. 22 shows the structure of a particulate filter.
Figure 22B:
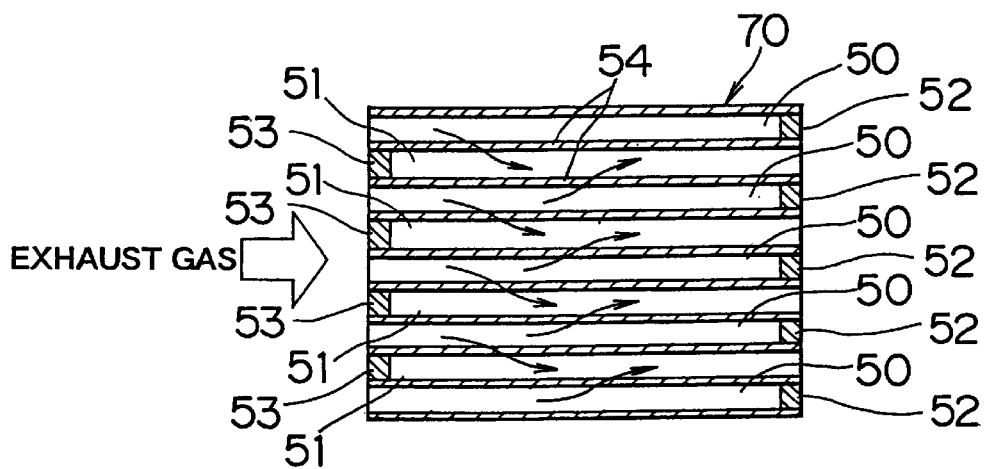

FIGS. 22A, 22B show the structure of the particulate filter 70. FIG. 22A is a front view of the particulate filter 70, and FIG. 22B is a side cross-sectional view of the particulate filter 70. As shown in FIGS. 22A, 22B, the particulate filter 70 has an elliptical front face, is designed as a wall-flow type of a honeycomb structure formed of a porous material such as cordierite, and has a multitude of axial spaces divided by a multitude of partitions 54 extending in the axial direction. One of two adjacent ones of the axial spaces is closed on the downstream side by a cork 52, and the other is closed on the upstream side by a cork 53. Thus, one of the two adjacent axial spaces serves as an inflow passage 50, and the other serves as an outflow passage 51. As indicated by arrows in FIG. 22B, exhaust gas inevitably passes through the partitions 54. The particulates included in exhaust gas are much smaller than pores in the partitions 54. These particulates hit the upstream-side surfaces of the partitions 54 and the surfaces of the pores in the partitions 54 and are then collected. The partitions 54 function as collecting walls for collecting particulates. With a view to removing the collected particulates through oxidation, the particulate filter 70 employs a material such as alumina on the front and back surfaces of the partitions 54 and preferably on the surfaces of the pores in the partitions 54, and carries an active oxygen discharging agent and a noble metal catalyst, which will be described below.

The active oxygen discharging agent promotes the oxidation of particulates by discharging active oxygen. The active oxygen discharging agent preferably absorbs and retains oxygen if there is an excessive amount of oxygen around, and discharges the retained oxygen in the form of active oxygen if the concentration of ambient oxygen decreases.

Platinum Pt is normally employed as the noble metal catalyst. At least one material selected from alkaline metals such as potassium K, sodium Na, lithium Li, cesium Cs and rubidium Rb, alkaline earth metals such as barium Ba, calcium Ca and strontium Sr, rare earth elements such as lanthanum La and yttrium Y, and transition metals is employed as the active oxygen discharging agent.

In this case, it is preferable to employ alkaline metals or alkaline earth metals that are higher in ionization tendency than calcium Ca, namely, potassium K, lithium Li, cesium Cs, rubidium Rb, barium Ba and strontium Sr as the active oxygen discharging agent.

It will now be described how the collected particulates are removed by a particulate filter carrying such an active oxygen discharging agent, on the basis of an example of platinum Pt and potassium K. A similar effect of removing particulates is achieved if other noble metals, alkaline metals, alkaline earth metals, rare earth elements and transition metals are employed.

Because combustion is carried out in a diesel engine usually with an excessive amount of air, exhaust gas includes a great amount of excessive air. That is, if the ratio of air and fuel supplied to an intake passage and a combustion chamber is referred to as the air-fuel ratio of exhaust gas, the air-fuel ratio is lean. Because NO is generated in the combustion chamber, exhaust gas includes NO. Fuel includes sulfur S, which reacts with oxygen in the combustion chamber and turns into $SO_2$. Therefore, exhaust gas includes $SO_2$. Accordingly, the exhaust gas including excessive oxygen, NO and $SO_2$ flows into the upstream side of the particulate filter 70.

Figure 23A:
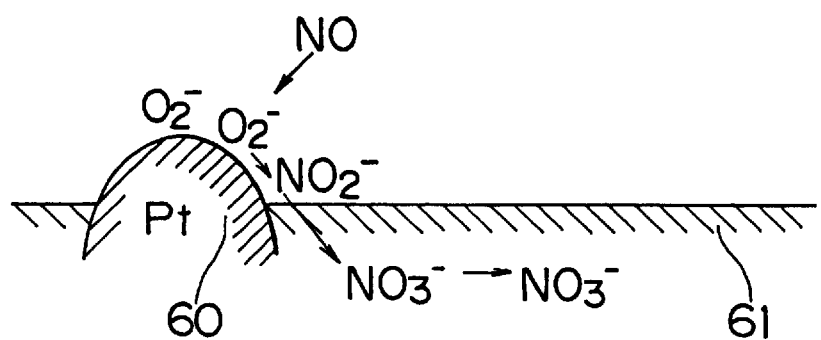
FIG. 23 is an explanatory view of the oxidative effect of a particulate.

Exhaust gas includes a great amount of excessive oxygen as described above. Therefore, if exhaust gas contacts the exhaust gas contact surface in the particulate filter, oxygen elements $O_2$ adhere to the surface of platinum Pt 60 in the form of $O_2^-$ or $O^{2-}$ as shown in FIG. 23A. On the other hand, the NO in exhaust gas reacts with $O_2^-$ or $O^{2-}$ on the surface of platinum Pt 60 and turns into $NO_2$ ($2NO+O_2 \rightarrow 2NO_2$). A portion of the produced $NO_2$ is then absorbed into the active oxygen discharging agent 61 while being oxidized on platinum Pt 60. Coupled with potassium K, $NO_2$ is diffused into the active oxygen discharging agent 61 in the form of nitrate ion $NO_3^-$ as shown in FIG. 23A, and produces potassium nitrate $KNO_3$. Thus, in this embodiment, the particulate filter 70 absorbs the noxious $NO_x$ included in exhaust gas and thereby makes it possible to substantially reduce the amount of the $NO_x$ discharged into the atmosphere.

On the other hand, as described above, exhaust gas also includes $SO_2$, which is also absorbed into the active oxygen discharging agent 61 by a mechanism similar to that of NO. That is, as described above, oxygen elements $O_2$ adhere to the surface of platinum Pt 60 in the form of $O_2^-$ or $O^{2-}$, and the $SO_2$ in exhaust gas reacts with $O_2^-$ or $O^{2-}$ on the surface of platinum Pt 60 and turns into $SO_3$.

A portion of the produced $SO_3$ is absorbed into the active oxygen discharging agent 61 while being further oxidized on platinum Pt 60. Coupled with potassium K, $SO_3$ is diffused into the active oxygen discharging agent 61 in the form of sulfate ion $SO_4^{2-}$ and produces potassium sulfate $K_2SO_4$. In this manner, potassium nitrate $KNO_3$ and potassium sulfate $K_2SO_4$ are produced.

Figure 23B:
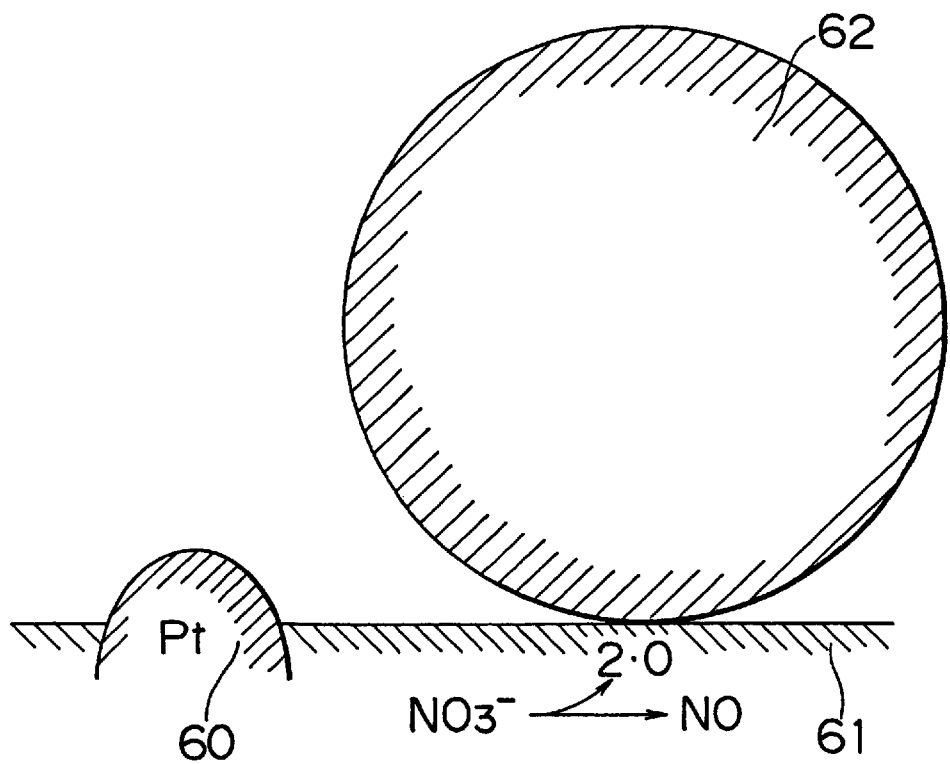

As indicated by a reference numeral 62 in FIG. 23B, a particulate in exhaust gas adheres to the surface of the active oxygen discharging agent 61 carried by the particulate filter. At this moment, the concentration of oxygen decreases on the contact surface between the particulate 62 and the active oxygen discharging agent 61. If the concentration of oxygen decreases, there is generated a difference in concentration between the particulate 62 and the inside of the active oxygen discharging agent 61, which is high in the concentration of oxygen. Therefore, the oxygen in the active oxygen discharging agent 61 is urged to move towards the contact surface between the particulate 62 and the active oxygen discharging agent 61. As a result, the potassium nitrate $KNO_3$ formed in the active oxygen discharging agent 61 is decomposed into potassium K, oxygen O and NO. The oxygen O moves towards the contact surface between the particulate 62 and the active oxygen discharging agent 61, and NO is discharged from the active oxygen discharging agent 61 to the outside. The NO discharged to the outside is oxidized on the downstream-side platinum Pt 60 and again absorbed into the active oxygen discharging agent 61.

On the other hand, the potassium sulfate $K_2SO_4$ formed in the active oxygen discharging agent 61 is also decomposed into potassium K, oxygen O and $SO_2$. The oxygen O moves towards the contact surface between the particulate 62 and the active oxygen discharging agent 61, and $SO_2$ is discharged from the active oxygen discharging agent 61 to the outside. The $SO_2$ discharged to the outside is oxidized on the downstream-side platinum Pt 60 and again absorbed into the active oxygen discharging agent 61. However, since potassium sulfate $K_2SO_4$ is stabilized, it is more unlikely to discharge active oxygen than potassium nitrate $KNO_3$.

On the other hand, the oxygen O moving towards the contact surface between the particulate 62 and the active oxygen discharging agent 61 is decomposed from compounds such as potassium nitrate $KNO_3$ and potassium sulfate $K_2SO_4$. The oxygen O decomposed from a compound is high in energy level and demonstrates an extremely high degree of activity. Accordingly, the oxygen moving towards the contact surface between the particulate 62 and the active oxygen discharging agent 61 is active oxygen O. If the active oxygen elements O contact the particulate 62, the particulate 62 is oxidized without generating luminous flames. The time required for the particulates to be moved through oxidation on the particulate filter ranges from a few minutes to dozen of minutes.

It is considered that $NO_x$ are diffused in the active-oxygen discharhe agent 61 in the form of nitrate ion $NO_3$ while repeatedly connceting to and separating from oxygen atoms. Active oxygen is geerated also dring this period. The particulates 62 are oxidized also by this active oxygen. Further, the particulates 62 that have thus adhered onto the particulate fulter are axidized by active oxygen O but are oxidized also by oxygen in exhaust gas.

Platinum Pt 60 and the active oxygen discharging agent 61 are activated as the temperature of the particulate filter rises. The amount of the active oxygen O discharged by the active oxygen discharging agent 61 per unit time increases as the temperature of the particulate filter rises. As a matter of course, particulates are more likely to be removed by oxidation as the temperature of the particulates themselves rises. Accordingly, the amount of the particulates that can be removed through oxidation on the particulate filter per unit time without generating luminous flames increases as the temperature of the particulate filter rises.

Figure 24:
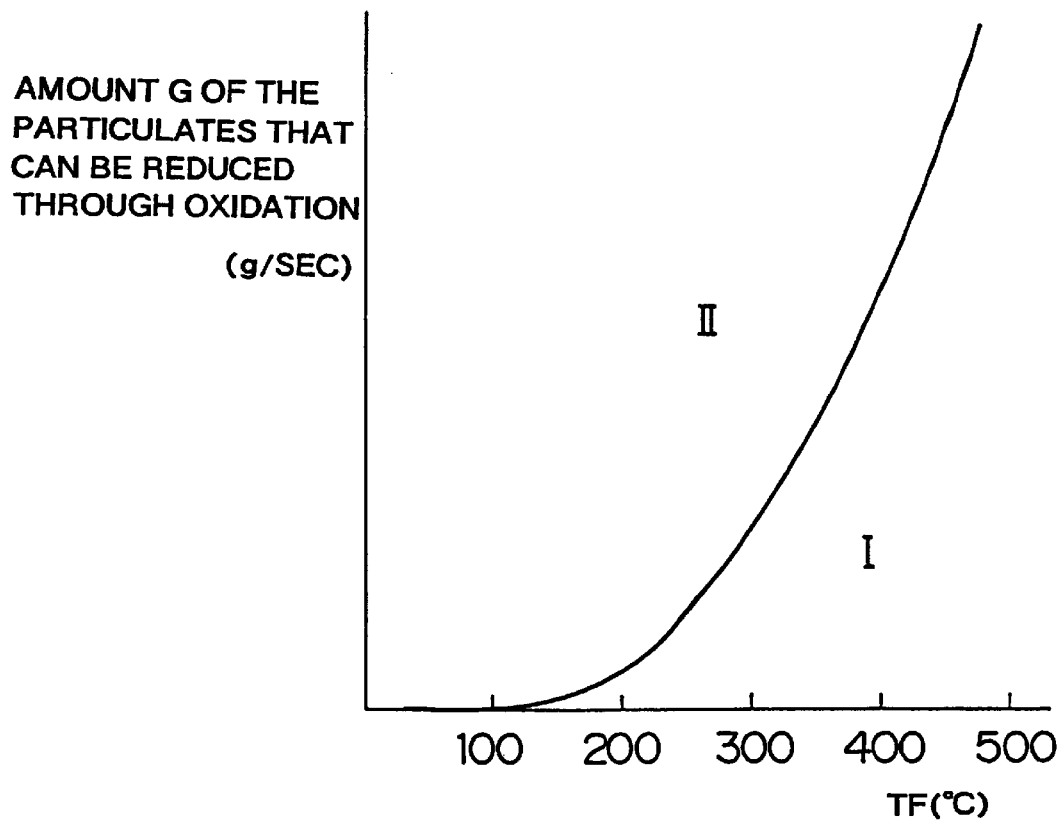
FIG. 24 shows the relation between amounts of particulates that can be removed through oxidation and temperatures of the particulate filter.

FIG. 24 shows with a solid line the amounts G of the particulates that can be removed through oxidation per unit time without generating luminous flames. In FIG. 24, the axis of abscissa shows the temperatures TF of a particulate filter. Although FIG. 24 shows the amount of particulates G that can be removed by oxidation in the case where the unit time is one second, i.e., per one second, the unit time can be an arbitrary length of time such as one minute, ten minutes, the amount of the particulates G that can be removed per unit time by oxidation represents the amount of the particulates G that can be removed per ten minutes by oxidation. In this case, the amount of particulates G that can be removed per unit time by oxidation on the particulate filter without luminous flame is likewise increased as the temperature of the particulate filter rises, as shown in FIG. 24.

The amount of the particulates discharged from a combustion chamber per unit time is referred to as the amount M of discharged particulates. If the amount M of discharged particulates is smaller than the amount G of the particulates that can be removed through oxidation as in a range I shown in FIG. 24, most particulates discharged from the combustion chamber are removed through oxidation in the particulate filter within a short time without generating luminous flames as soon as they are collected by the particulate filter. The time required for the particulates to be moved through oxidation on the particulate filter ranges from a few minutes to dozen of minutes.

Figure 25A:
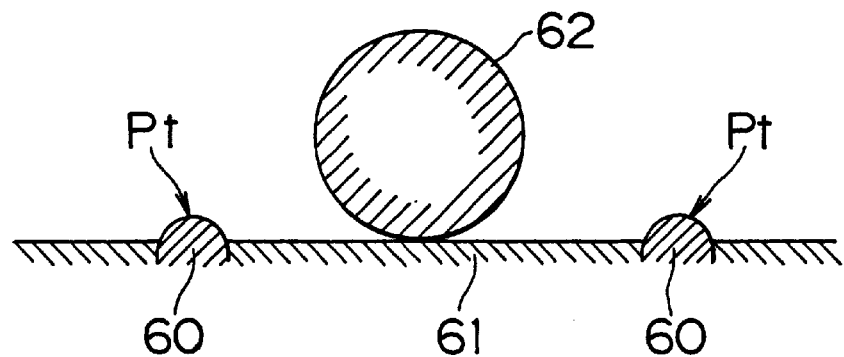
FIG. 25 is an explanatory view of the depositional effect of the particulate filter.
Figure 25B:
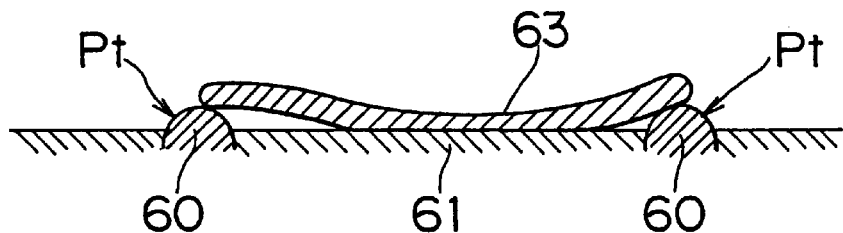
Figure 25C:
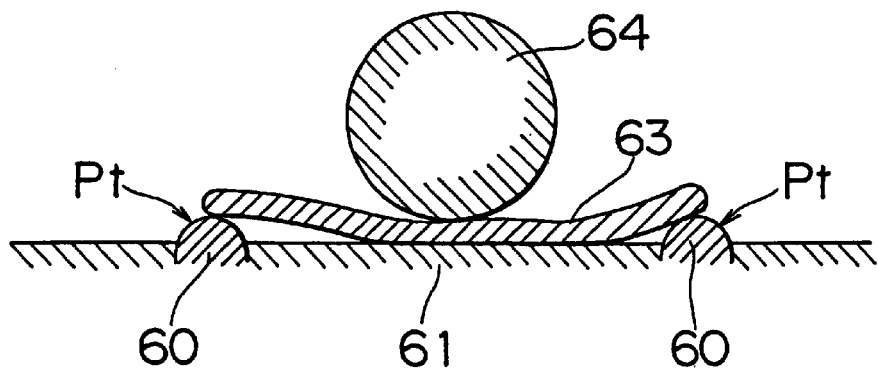

On the other hand, if the amount M of discharged particulates is greater than the amount G of the particulates that can be reduced through oxidation as in a range II shown in FIG. 24, the amount of active oxygen is insufficient to oxidize all the particulates. FIGS. 25A through 25C show how a particulate is oxidized in such a case. That is, in the case where the amount of active oxygen is insufficient to oxidize all the particulates, if the particulate 62 adheres to the active oxygen discharging agent 61 as shown in FIG. 25A, only a portion of the particulate 62 is oxidized, and the portion of the particulate 62 that has not been oxidized sufficiently remains on the upstream-side surface of the particulate filter. If the amount of active oxygen continues to be insufficient, the portion of the particulate that has not been oxidized gradually remains on the upstream-side surface of the particulate filter. As a result, as shown in FIG. 25B, the upstream-side surface of the particulate is covered with a residual particulate portion 63.

The residual particulate portion 63 is gradually transformed into a carbon material, which is unlikely to be oxidized. If the upstream-side surface of the particulate filter is covered with the residual particulate portion 63, the oxidation effect of NO and $SO_2$ by platinum Pt 60 and the discharging effect of active oxygen by the active oxygen discharging agent 61 are weakened. The residual particulate portion 63 can be gradually oxidized over a long period of time. However, if one particulate 64 after another is stacked on the residual particulate portion 63, namely, if particulates are stacked and laminated, the particulates are not oxidized by active oxygen. Even if the particulates are likely to be oxidized, they are not oxidized by active oxygen because they are spaced apart from platinum Pt 60 and the active oxygen discharging agent. Accordingly, one particulate after another is stacked on the particulate 64. Namely, if the amount M of discharged particulates remains greater than the amount G of the particulates that can be removed through oxidation, particulates are stacked and laminated on the particulate filter. stacked and laminated on the particulate filter in the range II shown in FIG. 24. Thus, if the relation between the amount M of discharged particulates and the amount G of the particulates that can be removed through oxidation is set in the range I, it becomes possible to prevent particulates from being stacked on the particulate filter. If the discharged particulate amount M is thus maintained smaller than the amount of particulates G that can be removed by oxidation, no particulate is deposited on the particulate filter in a laminated manner. As a result, the pressure loss of exhaust gas flow in the particulate filter scarcely changes and is maintained at a substantially constant minimum pressure loss value. Thus, the decrease in engine output can be maintained at its minimum value. However, this is not always ensured, and particulates may be stacked on the particulate filter if no countermeasure is taken.

Figure 26:
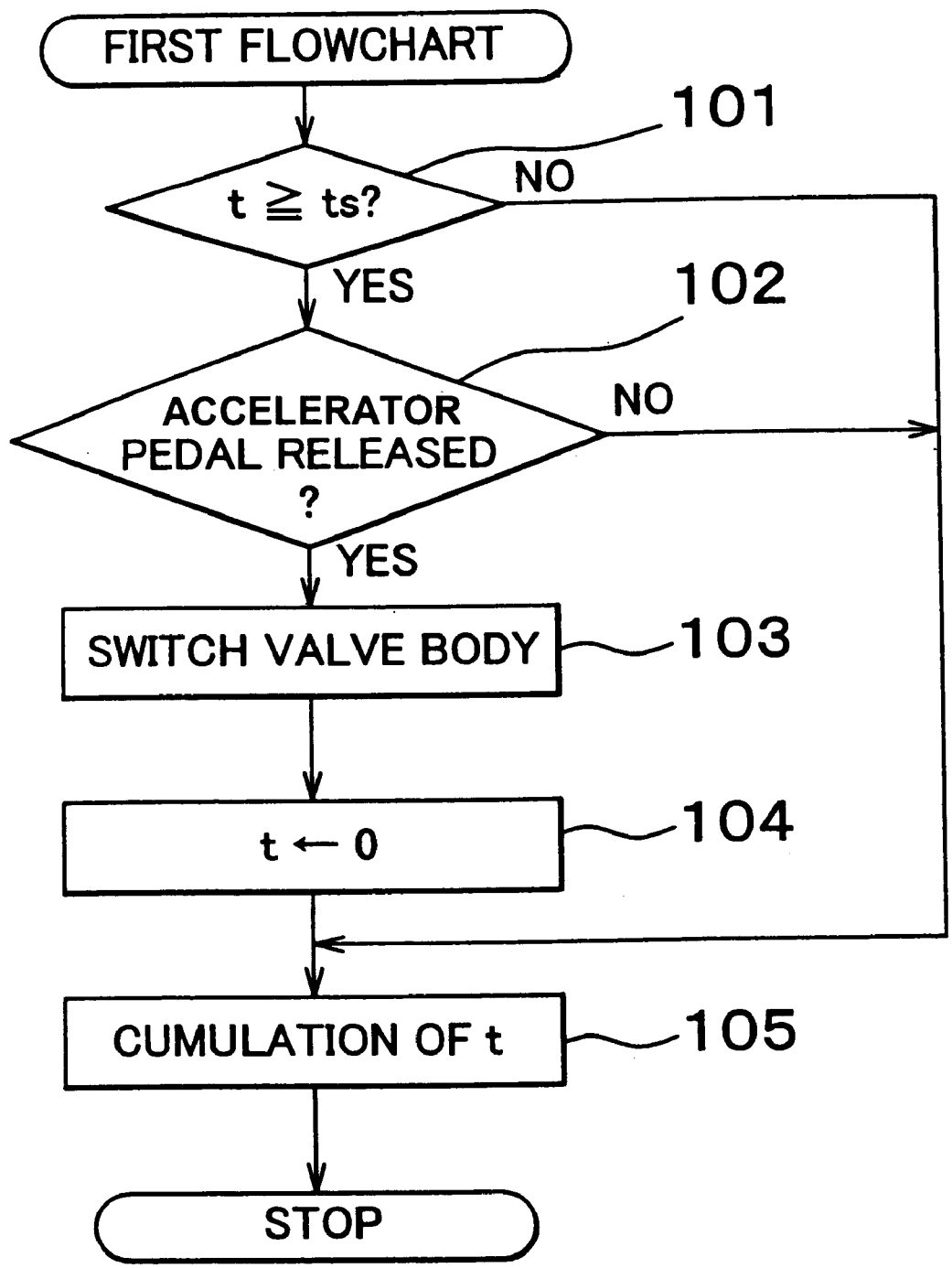
FIG. 26 is a first flowchart for preventing the deposition of particulates on the particulate filter.
Figure 27A:
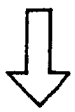
FIG. 27 is an enlarged cross-sectional view of a partition of the particulate filter.
Figure 27A:
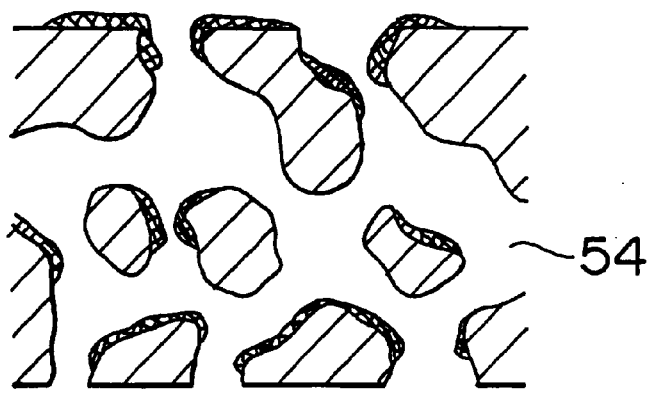
Figure 27B:
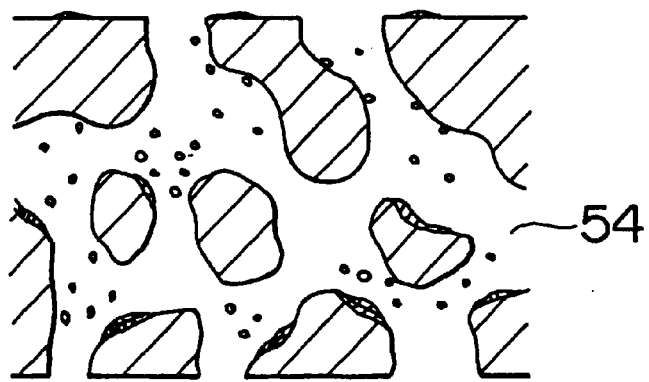
Figure 27B:

In this embodiment, the electronic control unit 30 performs change-over control of the valve body 71a in accordance with a first flowchart shown in FIG. 26 and prevents particulates from being stacked on the particulate filter. This flowchart is repeated at intervals of a predetermined period. First of all, it is judged in Step 101 whether or not the cumulative time t is equal to or longer than a set time ts. The cumulative time t represents a time that has elapsed after the switching of the valve body 71a. If the result of the judgment in Step 101 is NO, the cumulative time t is cumulated in Step 105 and the routine is terminated. If the result of the judgment in Step 101 is YES, the operation proceeds to Step 102. It is judged in Step 102 whether or not an accelerator pedal has been released by a limit switch or the like mounted thereto while the vehicle is traveling. If the result of the judgment in Step 102 is NO, the cumulative time t is cumulated in Step 105 and the routine is terminated.

If the result of the judgment in Step 102 is YES, the valve body 71a is switched in Step 103. In other words, the upstream and downstream sides of the particulate filter are reversed. Then the cumulative time t is reset to O in Step 104. The cumulative time t is again cumulated in Step 105 and the routine is terminated.

FIG. 27 is an enlarged cross-sectional view of the partition 54 of the particulate filter. While the vehicle is traveling, operation may be performed in the range II shown in FIG. 24. As indicated by grids in FIG. 27A, the upstream-side surfaces and the gas-flow facing surfaces of the partition 54, which is mainly hit by exhaust gas, hit particulates, serve as one collecting surface to collect the particulates, and remove them through oxidation using an active oxygen discharging agent. The removal of the particulates through oxidation is sometimes so insufficient that some particulates may exist as residues. At this moment, the exhaust gas resistance of the particulate filter does not adversely affect the traveling of the vehicle. However, a problem such as a substantial decrease in the engine output is caused if more particulates are stacked. If the upstream-side and downstream-side of the particulate filter are reversed when such an amount of particulates remains, no more particulates are stacked on the particulates remaining on one collecting surface of the partition 54. The residual particulates are gradually removed through oxidation by the active oxygen discharged from one collecting surface. Especially, as shown in FIG. 27B, the particulates remaining in the pores in the partition 54 are easily destroyed and fractioned by the flow of exhaust gas in the reverse direction and move towards the downstream side.

Thereby, many of the fractioned particulates are diffused into the pores in the partitions, come into direct contact with the active oxygen discharging agent carried by the surfaces of the pores in the partitions, and thus become likely to be removed through oxidation. Thus, if the active oxygen discharging agent is also carried in the pores in the partitions, it becomes much easier to remove the residual particulates through oxidation. In addition to the removal of particulates through oxidation, more particulates in exhaust gas adhere to the other collecting surface of the partition 54 which has been switched to the upstream side due to the back-flow of exhaust gas, namely, the upstream-side surfaces and the gas-flow facing surfaces of the partition 54 which is mainly hit by exhaust gas at the moment (on the other side of one collecting surface), and are removed through oxidation by the active oxygen discharged from the active oxygen discharging agent. A portion of the active oxygen discharged from the active oxygen discharging agent at the time of the removal through oxidation moves towards the downstream side together with exhaust gas, and removes, through oxidation, the particulates that still remain even after the back-flow of exhaust gas.

That is, the residual particulates on one collecting surface of the partition is reached not only by the active oxygen discharged from the collecting surface but also by the remaining active oxygen that has been used to remove through oxidation the particulates on the other collecting surface of the partition due to the back-flow of exhaust gas, together with exhaust gas. Thus, even if some particulates are stacked and laminated on one collecting surface of the partition when the valve body is switched, the back-flow of exhaust gas ensures that active oxygen also reaches the particulates stacked on the residual particulates, and that no more particulates are stacked. Therefore, the stacked particulates are gradually removed through oxidation. A sufficient amount of them can be removed through oxidation if a certain period of time remains until the flow of exhaust gas is reversed next time.

In the first flowchart, the valve body is switched every time the accelerator pedal is released while the vehicle is traveling. Therefore, for example, even when the vehicle goes up a slope over a long period of time, the accelerator pedal is often released with the intention of decelerating the vehicle. In other words, the valve body does not remain untouched for a long time. Therefore, even if operation is often performed in the range II shown in FIG. 24, there is no possibility that a great amount of particulates be stacked on the particulate filter when the valve body is switched or that the particulates stacked on the particulate filter remain untouched for a long time and be transformed into a carbon material which is unlikely to be oxidized. Thus, as described above, the residual particulates and the stacked particulates can be reliably removed through oxidation by merely reversing the flow of exhaust gas. Further, since a great amount of stacked particulates burn at a time, the possibility of causing a problem such as dissolution of the particulate filter resulting from the generation of a great amount of combustion heat is eliminated.

Thus, the reversal of the upstream and downstream sides of the particulate filter is highly effective in removing the residual particulates and the stacked particulates through oxidation. However, according to the structure of the change-over portion 71 of this embodiment, as described above, while the valve body 71a is being switched from one of the first and second block positions to the other, a portion of exhaust gas bypasses the particulate filter 70. If the amount of particulates discharged from the combustion chamber of the engine is greater than a set discharge amount at this moment, a relatively great amount of particulates are included in exhaust gas. These particulates are discharged into the atmosphere. However, in the first flowchart, the valve body is switched when the accelerator pedal is released, and at this moment, the supply of fuel is stopped with the intention of decelerating the vehicle, or only a small amount of fuel is being injected. Therefore, the amount of the particulates discharged from the combustion chamber of the engine is equal to or smaller than the set discharge amount, and almost no particulates are included in exhaust gas. In the first flowchart, if the cumulative time t since the last release of the accelerator pedal has not reached the set time when the accelerator pedal is released, the valve body is not switched. This does not limit the invention but makes it possible to prevent the valve body from being switched unnecessarily in the case where the accelerator pedal is released frequently, prolong the life span of the valve body and an actuator for driving the valve body, and reduce the frequency of generation of noise when the valve body is driven. In this flowchart, the release of the accelerator pedal is detected to judge whether or not the engine is being decelerated. As a matter of course, however, it is possible to detect that the decrease amount or the decrease rate of the depression amount of the accelerator pedal has become greater than a set value, and thereby judge whether or not the engine is being decelerated. Even if the accelerator pedal is not released in this case, the amount of fuel injection at this time is sufficiently small, and the amount of the particulates discharged from the combustion chamber of the engine is equal to or smaller than the set discharge amount. Therefore, the amount of the particulates discharged into the atmosphere during the switching of the valve body does not increase substantially, and no serious problem is caused.

Figure 28:
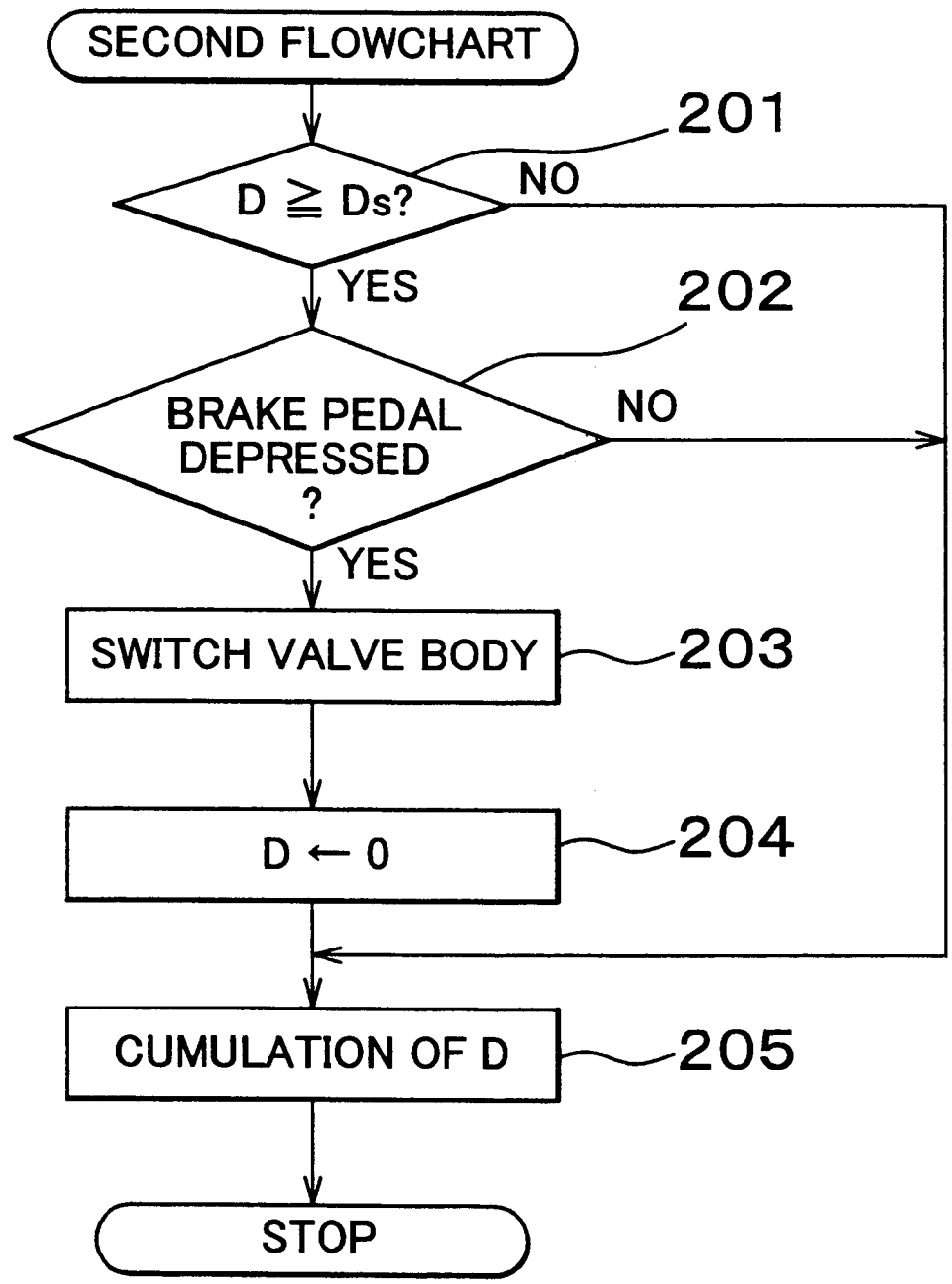
FIG. 28 is a second flowchart for preventing the deposition of particulates on the particulate filter.

FIG. 28 shows a second flowchart that is used instead of the first flowchart. The following description will be limited to the difference between the first and second flowcharts. In the second flowchart, if the cumulative running distance D is equal to or longer than a set running distance Ds, it is judged whether or not a brake pedal has been depressed by a limit switch or the like mounted thereto while the vehicle is traveling. If the result of the judgment is YES, the valve body is switched and the upstream and downstream sides of the particulate filter are reversed. There is no need to provide a new limit switch. Namely, it is also possible to use a switch for lighting a brake lamp as the limit switch.

In the second flowchart, the valve body is switched every time the brake pedal is depressed. Therefore, the valve body does not remain untouched for a long time. Thus, as in the first flowchart, the residual particulates and the stacked particulates can be reliably removed through oxidation merely by the back-flow of exhaust gas. In the second flowchart, the valve body is switched when the brake pedal is depressed. At this moment, the supply of fuel is stopped with the intention of decelerating the vehicle, or only a small amount of fuel is injected. Therefore, the amount of the particulates discharged from the combustion chamber of the engine is equal to or smaller than the set discharge amount, and almost no particulates are included in exhaust gas. Even if exhaust gas has bypassed the particulate filter when the valve body is switched, no particulates are discharged into the atmosphere.

In the second flowchart, if the cumulative running distance D since the last depression of the brake pedal has not reached the set running distance when the brake pedal is released, the valve body is not switched. This does not limit the invention but makes it possible to prevent the valve body from being switched unnecessarily in the case where the brake pedal is depressed frequently, prolong the life span of the valve body and an actuator for driving the valve body, and reduce the frequency of generation of noise when the valve body is driven. As a matter course, the cumulative running distance in the second flowchart can be replaced by the cumulative time in the first flowchart. Conversely, the cumulative time in the first flowchart can be replaced by the cumulative running distance.

In the first and second flowcharts, the valve body is switched by releasing the accelerator pedal or depressing the brake pedal while the vehicle is traveling. However, the valve body may be switched by depressing the accelerator pedal or depressing the brake pedal even while the vehicle is stopped. At this moment, since the vehicle is in idling operation, the amount of fuel injection is small and almost no particulates are included in exhaust gas. Therefore, no particulates are discharged into the atmosphere.

When the vehicle decelerates or is in idling operation, fuel injection is not carried out or the amount of fuel injection is small. Therefore, the temperature of exhaust gas is considerably low. If the low-temperature exhaust gas passes through the particulate filter, the temperature of the particulate filter falls and the amount of the particulates that can be removed through oxidation decreases. Thus, in the first and second flowcharts, if even a portion of the low-temperature exhaust gas has bypassed the particulate filter through the switching of the valve body, the fall in the temperature of the particulate filter can be prevented effectively. Accordingly, it is preferable to reduce the switching speed of the valve body to ensure that much of the low-temperature exhaust gas bypasses the particulate filter.

Figure 29:
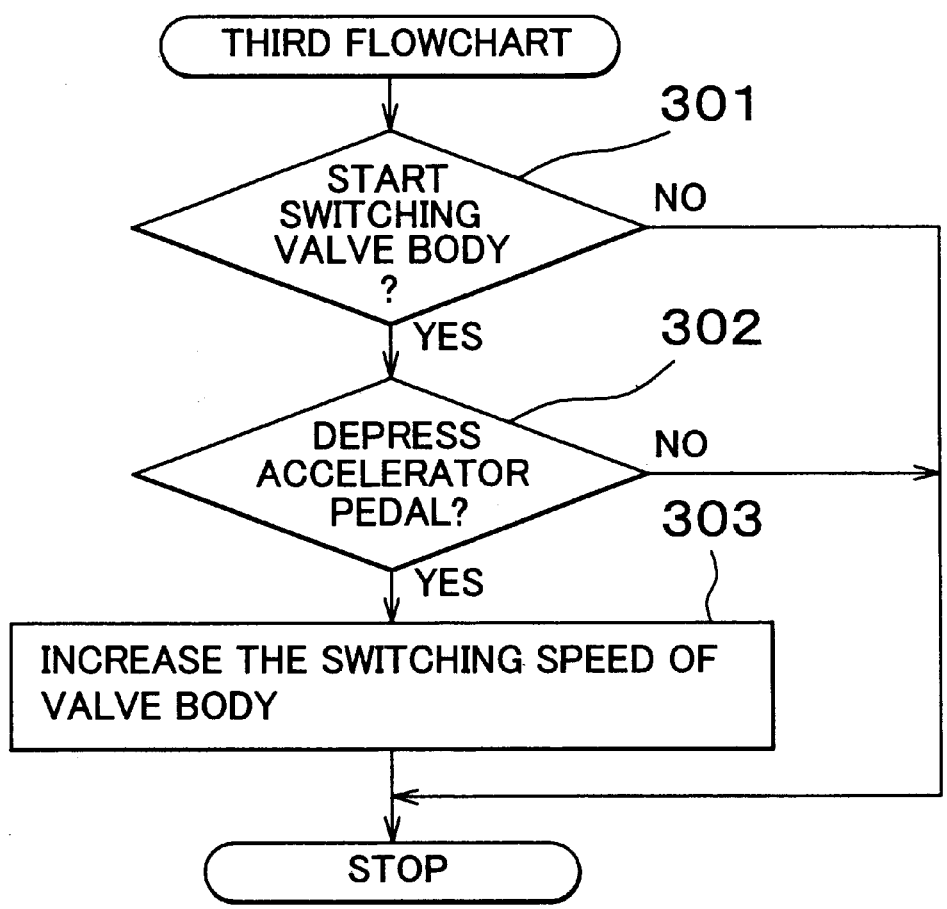
FIG. 29 is a third flowchart for preventing the deposition of particulates on the particulate filter.

However, it is not appropriate to always reduce the switching speed of the valve body. It is preferable to change the switching speed of the valve body in accordance with a third flowchart shown in FIG. 29. The third flowchart is repeated at intervals of a predetermined period. First of all, it is judged in Step 301 whether or not the switching of the valve body has been started by the first or second flowchart. If the result of the judgment is NO, the routine is terminated immediately. However, if the switching of the valve body has been switched, it is judged in Step 302 whether or not the accelerator pedal has been depressed. If the result of the judgment is NO, the switching speed of the valve body remains low and the switching of the valve body is continued. A low switching speed of the valve body means not only that the valve body continuously moves with a small amount of displacement per unit time but also that the valve body moves intermittently.

On the other hand, if the result of the judgment in Step 302 is YES, the switching speed of the valve body is increased in Step 303. That is, if the vehicle is accelerated during the switching of the valve body, the amount of displacement of the valve body per unit time is increased so that the valve body moves continuously and that the switching of the valve body is terminated as soon as possible. Thus, a great amount of particulates are included in exhaust gas because of acceleration. However, if the switching of the valve body is terminated quickly, the amount of the particulates bypassing the particulate filter to be discharged into the atmosphere can be reduced.

Figure 30:
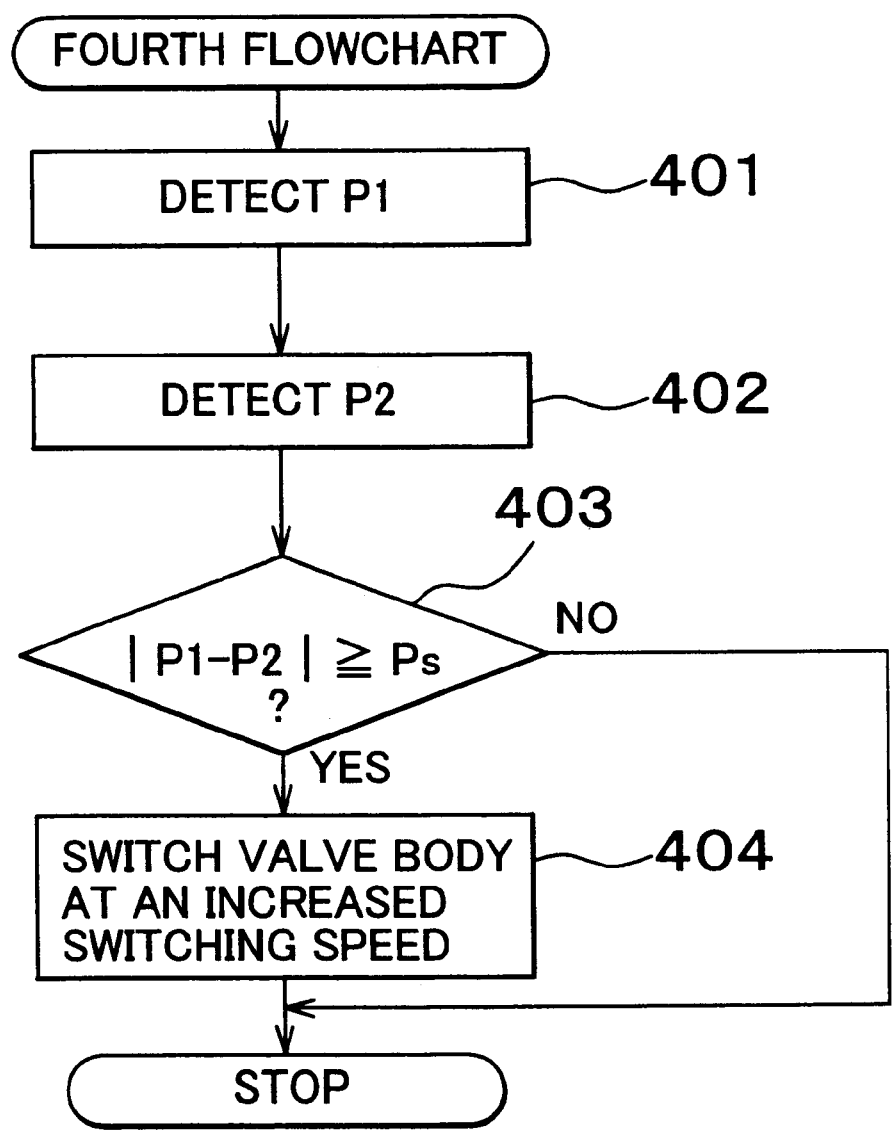
FIG. 30 is a fourth flowchart for preventing the deposition of particulates on the particulate filter.

If the valve body is switched according to the first or second flowchart, it is barely possible to prevent a great amount of particulates from being stacked on the particulate filter. However, if the accelerator pedal remains unreleased for a long time or if the brake pedal remains undepressed for a long time for some reason, the valve body may not be switched even when a certain amount of particulates are stacked on the particulate filter. In order to prevent any more particulates from being stacked, it is preferable to use a fourth flowchart shown in FIG. 30 in combination with the first or second flowchart. The fourth flowchart is also repeated at intervals of a predetermined period.

First of all in Step 401, a pressure sensor disposed in the first connecting portion 72a detects an exhaust gas pressure P1 on one side of the particulate filter 70, namely, an exhaust gas pressure in the first connecting portion 72a (see FIG. 18). Then in Step 402, a pressure sensor disposed in the second connecting portion 72b detects an exhaust gas pressure P2 on the other side of the particulate filter, namely, an exhaust gas pressure in the second connecting portion 72b (see FIG. 18).

It is judged in Step 403 whether or not the absolute value of the difference between the exhaust gas pressures detected in Step 401 and Step 402 has become equal to or higher than a set differential pressure Ps. The absolute value of the differential pressure is used herein for the purpose of making it possible to grasp a rise in the differential pressure regardless of whether the first connecting portion 72a or the second connecting portion 72b is located on the upstream side. If the result of the judgment in Step 403 is NO, the routine is terminated immediately. If the result of the judgment is YES, the vehicle travels for a long time without being decelerated and a certain amount of particulates are stacked on the particulate filter. Therefore, in Step 404, the valve body is switched at a high switching speed.

Thereby, as described above, the stacked particulates are removed from the particulate filter through oxidation. At this moment, since the valve body is not switched by the first or second flowchart, the vehicle is not being decelerated and a relatively great amount of particulates may be included in exhaust gas. Therefore, it is preferable to minimize the amount of the particulates discharged into the atmosphere by switching the valve body at an increased switching speed as in the fourth flowchart. In the fourth flowchart, the stacking of a certain amount of particulates on the particulate filter is indirectly detected using the differential pressure between both the sides of the particulate filter. However, for example, it is also possible to monitor changes in the electric resistance value on a predetermined partition of the particulate filter and judge that a certain amount of particulates are stacked on the particulate filter as soon as the electric resistance value becomes equal to or smaller than a set value due to the stacking of particulates. Further, it is also possible to judge that a certain amount of particulates are stacked on the particulate filter using the fact that the transmission factor or reflection factor of light decreases due to the stacking of particulates on the predetermined partition of the particulate filter. Strictly speaking, the difference between pressures on both the sides of the particulate filter also changes depending on the pressure of the exhaust gas discharged from the cylinder in each operation state of the engine. Therefore, when judging whether or not a certain amount of particulates are stacked, it is preferable that the operation state of the engine be specified. It is also possible to constantly monitor the difference between pressures on both the sides of the particulate filter or the pressure of exhaust gas upstream of the particulate filter by using changes in the pressure of exhaust gas for each operation state of the engine, and judge that the engine is being decelerated as soon as the difference in the pressures or the pressure of exhaust gas decreases abruptly.

In the first and second flowcharts, when the engine is being decelerated, the amount of the particulates discharged from the combustion chamber of the engine is equal to or smaller than the set discharge amount. If the valve body is switched at this moment, the amount of the particulates discharged into the atmosphere can be reduced. However it is not only when the engine is being decelerated that the discharge amount of particulates is equal to or smaller than the set discharge amount.

Figure 31:
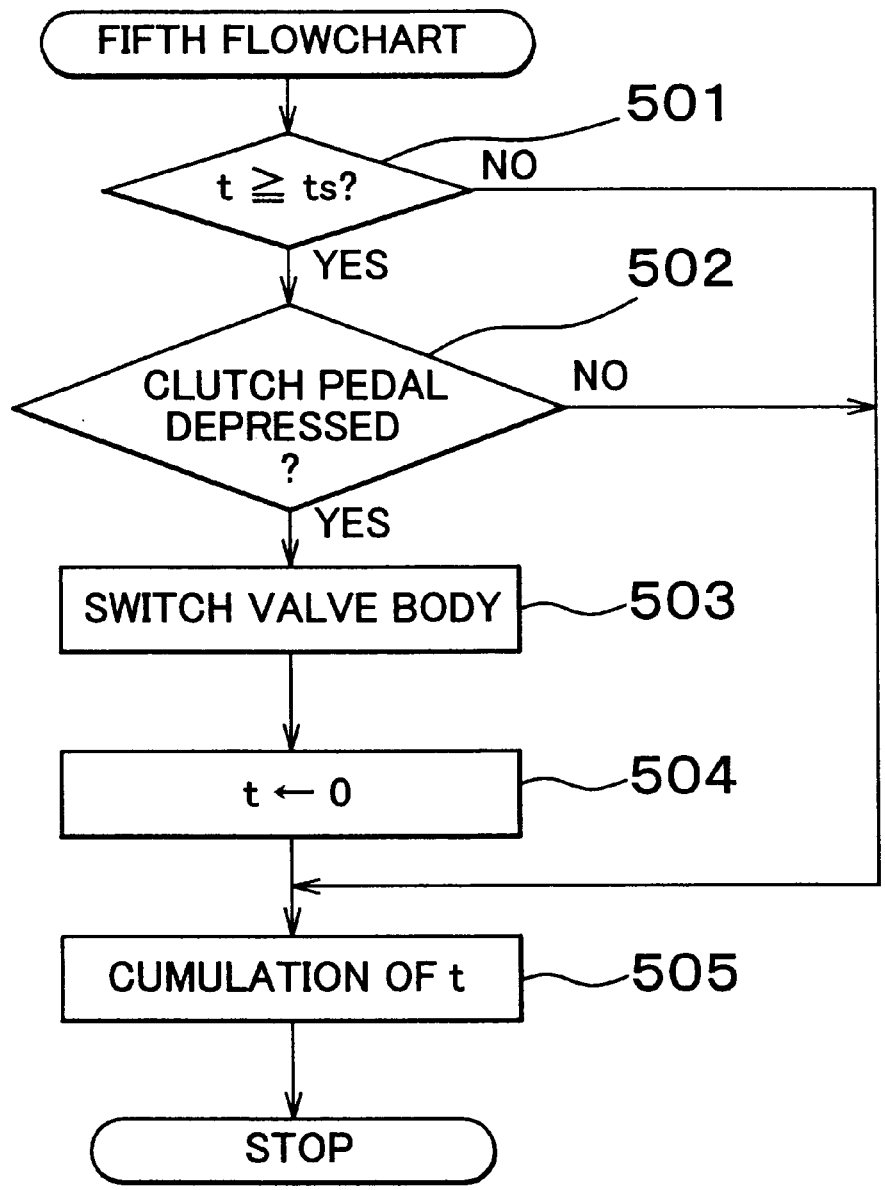
FIG. 31 is a fifth flowchart for preventing the deposition of particulates on the particulate filter.

FIG. 31 shows a fifth flowchart that is used instead of the first flowchart. The following description will be limited to the difference between the first and fifth flowcharts. In the fifth flowchart, it is judged in Step 502 whether or not a clutch pedal has been depressed by a limit switch or the like mounted thereto. If the result of the judgment is YES, the valve body is switched in Step 503. When depressing the clutch pedal for the purpose of gearshift, a driver normally releases the accelerator pedal or at least substantially reduces the depression amount of the accelerator pedal. Thus, even during such gearshift, the amount of fuel injection is small and the amount of the particulates discharged from the combustion chamber of the engine is equal to or smaller than the set discharge amount. For this reason, even if the valve body has been switched to prevent particulates from being stacked on the particulate filter, no problem is caused in particular. In order to make the amount of the particulates discharged into the atmosphere equal to zero, the supply of fuel may be stopped regardless of the depression amount of the accelerator pedal as soon as the clutch pedal is depressed, and the supply of fuel may remain stopped regardless of the depression amount of the accelerator pedal while the valve body is being switched.

Figure 32:
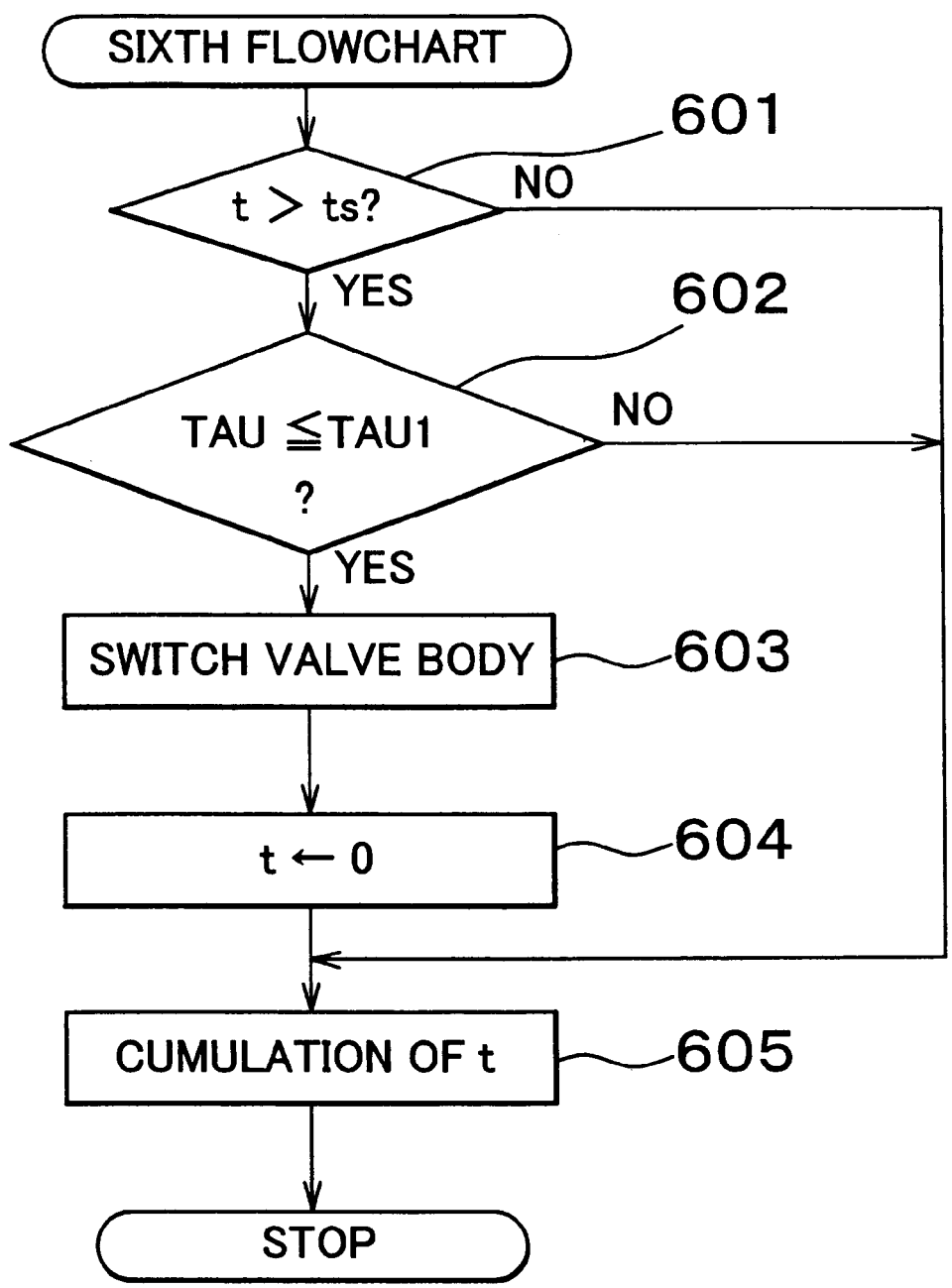
FIG. 32 is a sixth flowchart for preventing the deposition of particulates on the particulate filter.

FIG. 32 shows a sixth flowchart that is used instead of the first flowchart. The following description will be limited to the difference between the first and sixth flowcharts. In the sixth flowchart, it is judged in Step 602 whether or not the amount TAU of fuel injection is equal to or smaller than a set injection amount TAU1. If the result of the judgment is YES, the valve body is switched in Step 603. In any operation state including the deceleration of the engine and gearshift, if the amount TAU of fuel injection is equal to or smaller than the set injection amount TAU1, the amount of fuel injection is small and the amount of the particulates discharged from the combustion chamber of the engine is equal to or smaller than the set discharge amount. For this reason, even if the valve body has been switched to prevent particulates from being stacked on the particulate filter, no problem is caused in particular.

Figure 33:
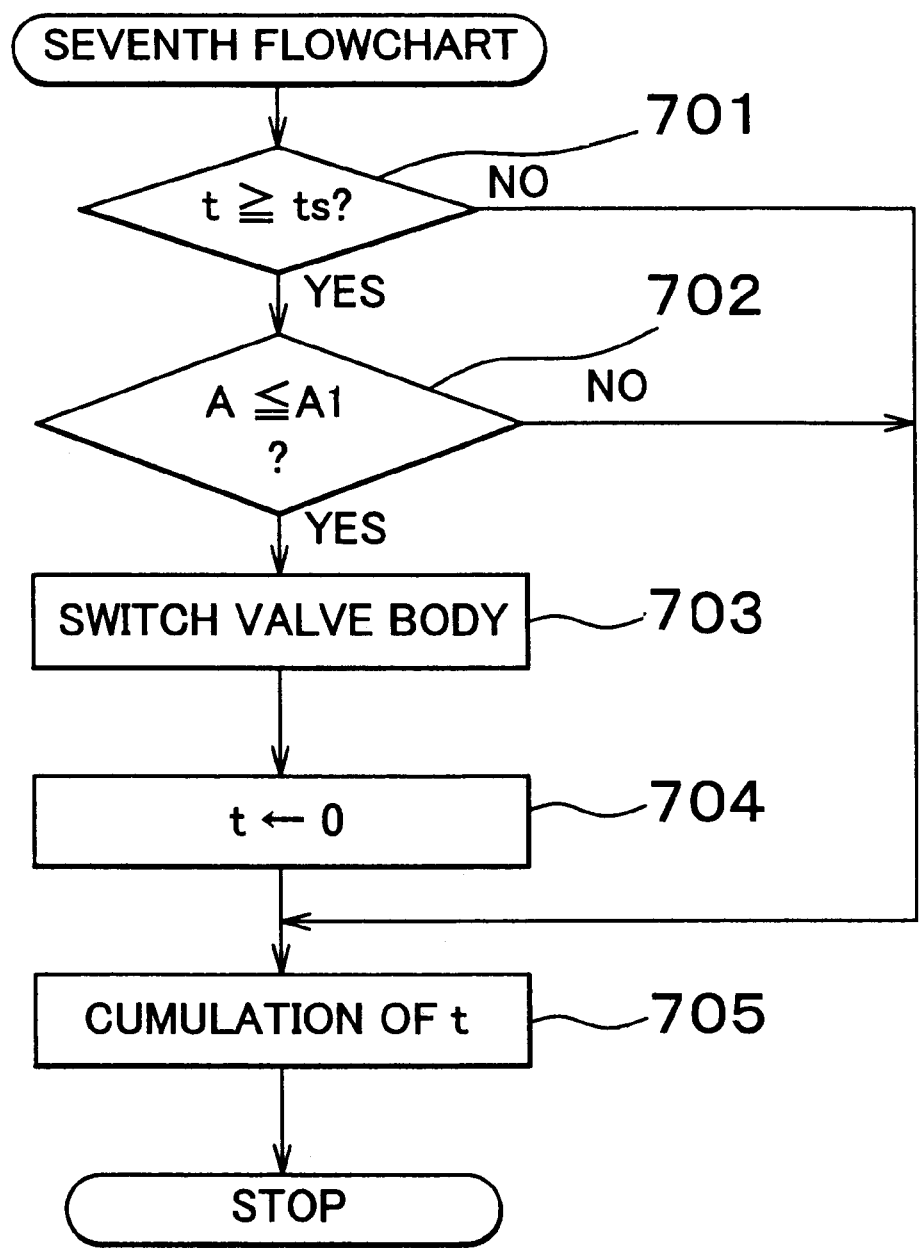
FIG. 33 is a seventh flowchart for preventing the deposition of particulates on the particulate filter.

FIG. 33 shows a seventh flowchart that is used instead of the first flowchart. The following description will be limited to the difference between the first and seventh flowcharts. In the seventh flowchart, it is judged in Step 702 whether or not the depression amount A of the accelerator pedal is equal to or smaller than a set depression amount Al. If the result of the judgment is YES, the valve body is switched in Step 703. In any operation state including the deceleration of the engine and gearshift, if the depression amount A of the accelerator pedal is equal to or smaller than the set depression amount Al, the amount of fuel injection is small and the amount of the particulates discharged from the combustion chamber of the engine is equal to or smaller than the set discharge amount. For this reason, even if the valve body has been switched to prevent particulates from being stacked on the particulate filter, no problem is caused in particular. In performing the processings in the fifth, sixth and seventh flowcharts, it is preferable to perform the processings in the third and fourth flowcharts in the same manner as those in the first and second flowcharts.

As shown in FIG. 18, the particulate filter 70 of this embodiment is connected to the change-over portion 71 by the first connecting portion 72a and the second connecting portion 72b. For a flow path length, the first connecting portion 72a and the second connecting portion 72b demonstrate the same heat retaining properties. Thus, whichever connecting portion is located on the upstream side, the temperature of the particulate filter is not affected. However, for example, the first and second connecting portions can be made different in length or provided with a heat retaining material so as to demonstrate heat radiating properties per unit length. The temperature of the particulate filter can be increased if one of the connecting portions is thus located on the upstream side, and the temperature of the particulate filter can be reduced if the other connecting portion is thus located on the upstream side.

The effect of removing particulates through oxidation by the particulate filter of this embodiment is strengthened as its temperature rises. On the other hand, however, if the particulate filter is at an extremely high temperature, its catalytic function may deteriorate due to the sintering of platinum. In order to prevent this, it is preferable to utilize the aforementioned structure to reduce the temperature of the particulate filter with the other connecting portion located on the upstream side. When the valve body is switched, the engine is not being decelerated and a relatively great amount of particulates are often included in exhaust gas. It is advantageous to increase the switching speed of the valve body.

If the air-fuel ratio of exhaust gas is made rich, namely, if the concentration of oxygen in exhaust gas is reduced, active oxygen O is discharged from the active oxygen discharging agent 61 to the outside at a time. The stacked particulates can be burnt and removed at a time without generating luminous flames by the active oxygen O that has been discharged at a time. If the air-fuel ratio of exhaust gas is alternately made rich and lean, the amount of the active of the active oxygen discharged from the active oxygen discharging agent 61 to the outside increases. The particulates bound to one another like a chain are decomposed by the active oxygen O discharged to the outside, so that the particulates become likely to be oxidized. Thus, if the air-fuel ratio is made rich immediately after the upstream and downstream sides of the particulate filter have been switched by the valve body 71a, the other collecting surface of the partition of the particulate filter where no particulates remain or are stacked is more likely to discharge active oxygen than one collecting surface of the partition of the particulate filter. Thus, residual particulates and stacked particulates can be more reliably removed through oxidation by an increasing amount of active oxygen that is discharged. As a matter of course, the air-fuel ratio of exhaust gas can be sometimes made rich regardless of whether or not the valve body 71a has been switched. This makes it difficult for particulates to remain or be stacked on the particulate filter.

The air-fuel ratio of exhaust gas can be made rich for example through the aforementioned low-temperature combustion. As described above, since the low-temperature combustion is carried out on the low-load side of the engine, the low-temperature combustion is carried out immediately after the supply of fuel has been stopped during deceleration of the engine. Thus, according to the control based on the first or second flowchart, the low-temperature temperature combustion is carried out immediately after the switching of the valve body 71a, and the air-fuel ratio of exhaust gas is often made rich.

On the other hand, if the air-fuel ratio is maintained at a lean value, the surface of platinum Pt is covered with oxygen and so-called oxygen deterioration of platinum Pt is caused. If such deterioration is caused, the effect of oxidizing $NO_x$ deteriorates and thus the efficiency in absorbing $NO_x$ deteriorates. Thus, the amount of active oxygen discharged from the active oxygen discharge agent 61 decreases. However, if the air-fuel ratio is shifted to a rich value, oxygen on the surface of platinum Pt is consumed and thus the oxygen deterioration is eliminated. Accordingly, if the air-fuel ratio is shifted from a rich value to a lean value, the effect of oxidizing $NO_x$ is strengthened and thus the efficiency in absorbing $NO_x$ is enhanced. Thus, the amount of active oxygen discharged from the active-oxygen discharge agent 61 increase.

Accordingly, while the air-fuel ratio is maintained at a lean value, if the air-fuel ratio is sometimes temporarily shifted from the lean value to a rich value, the oxidation deterioration of platinum Pt is eliminated each time. Therefore, the amount of active oxygen discharged when the air-fuel ratio assumes a lean value is increased. Thus, the effect of oxidizing particulates on the particulate filter can be promoted.

In the presence of $SO_3$, the calcium Ca in exhaust gas produces calcium sulfate $CaSO_4$ in the form of ashes as described above. With a view to preventing the particulate filter from being clogged with calcium sulfate $CaSO_4$, if an alkaline metal or an alkaline earth metal that is higher in ionization tendency than calcium Ca, such as potassium K, is used as the active oxygen discharging agent 61, the $SO_3$ diffused into the active oxygen discharging agent 61 is coupled with potassium K and forms potassium nitrate $K_2SO_4$, and calcium Ca passes through the partitions of the particulate filter without being coupled to the $SO_3$. Consequently, the particulate filter is prevented from being clogged with ashes. Thus, as described above, it is preferable to employ an alkaline metal or an alkaline earth metal that is higher in ionization tendency than calcium Ca, such as potassium K, lithium Li, cesium Cs, rubidium Rb, barium Ba and strontium Sr as the active oxygen discharging agent 61.

Even if only a noble metal such as platinum Pt is carried on the particulate filter as an active oxygen discharging agent, it is possible to discharge active oxygen from the $NO_2$ or $SO_3$ retained on the surface of platinum Pt. In this case, however, a solid line indicating the amount G of the particulates that can be removed through oxidation is slightly offset rightwards with respect to the solid line shown in FIG. 24. It is also possible to employ ceria as an active oxygen discharging agent. Ceria absorbs oxygen if the concentration of oxygen in exhaust gas is high, and discharges active oxygen if the concentration of oxygen in exhaust gas decreases. Therefore, the air-fuel ratio of exhaust gas needs to be made rich regularly or irregularly so as to remove particulates through oxidation. It is also possible to employ an $NO_x$ occlusion-reduction catalyst for purifying the $NO_x$ in exhaust gas as an active oxygen discharging agent.

In this case, the air-fuel ratio of exhaust gas needs to be made rich at least temporarily so as to discharge the occluded $NO_x$ and $SO_x$. It is preferable to perform the control of making the air-fuel ratio rich immediately after the upstream and downstream sides of the particulate filter have been reversed. Even in the case where the control of making the air-fuel ratio rich and the switching of the valve body according to the fourth flowchart are performed simultaneously, the switching of the valve body at an increased switching speed is effective in preventing a great amount of exhaust gas including a great amount of CO and HC from being discharged into the atmosphere. Although this embodiment handles a diesel engine wherein low-temperature combustion and conventional combustion are carried out alternately, the invention is not limited thereby. As a matter of course, the invention is also applicable to a diesel engine wherein only conventional combustion is carried out or a gasoline engine that discharges particulates.

In this embodiment, the particulate filter itself carries an active oxygen discharging agent, which discharges particulate-oxidation promoting components such as active oxygen. However, this does not limit the invention. For example, as long as particulate-oxidation promoting components such as active oxygen and nitrogen dioxide, which functions in the same manner as active oxygen, oxidize the particulates collected by the particulate filter, no problem is caused if the particulate-oxidation promoting components are discharged from the particulate filter or a material carried thereon or if the particulate-oxidation promoting components flow into the particulate filter from the outside. Even in the case where the particulate-oxidation promoting components flow into the particulate filter from the outside, if the first and second collecting surfaces of a collecting wall are used alternately for the purpose of collecting particulates, no more particulates are stacked on one of the collecting surfaces that is located on the downstream side. The stacked particulates can be gradually removed through oxidation by the particulate-oxidation promoting components flowing in from the other collecting surface. That is, a sufficient amount of the stacked particulates can be removed through oxidation within a certain period of time. Meanwhile, since particulates are collected and oxidized by the particulate-oxidation promoting components on the other collecting surface, it is possible to substantially achieve the same effect as described above.

What is claimed is:

1. An exhaust gas purifier for an internal combustion engine, comprising:

a particulate filter disposed in an exhaust system of the engine to collect and oxidize particulates; and a reversal device for reversing upstream and downstream sides of the particulate filter, wherein the particulate filter has a collecting wall for collecting particulates, the collecting wall has first and second collecting surfaces, and the first and second collecting surfaces of the collecting wall are used alternately to collect particulates through reversal of the upstream and downstream sides of the particulate filter by the reversal device, wherein the reversal device has a valve body and reverses the upstream and downstream sides of the particulate filter by switching the valve body from one position to the other position, and at least a portion of exhaust gas bypasses the particulate filter while the valve body is being switched from one position to the other position, and wherein the reversal device reverses the upstream and downstream sides of the particulate filter at a switching speed corresponding to an operation state of the engine.

2. The exhaust gas purifier according to claim 1, wherein an active oxygen discharging agent is carried on the collecting wall, and active oxygen discharged from the active oxygen discharging agent oxidizes particulates.

3. The exhaust gas purifier according to claim 2, wherein the active oxygen discharging agent absorbs and retains oxygen if there is an excessive amount of oxygen around, and discharges the retained oxygen in the form of active oxygen if the concentration of ambient oxygen decreases.

4. A method for purifying an exhaust gas of an internal combustion engine, including a particulate filter disposed in an exhaust system of the engine to collect and oxidize particulates and a reversal device for reversing upstream and downstream sides of the particulate filter, wherein the particulate filter has a collecting wall for collecting particulates, the collecting wall has first and second collecting surfaces, and the first and second collecting surfaces of the collecting wall are used alternately to collect particulates through reversal of the upstream and downstream sides of the particulate filter by the reversal device, and wherein the reversal device has a valve body and reverses the upstream and downstream sides of the particulate filter by switching the valve body from one position to the other position, and at least a portion of exhaust gas bypasses the particulate filter while the valve body is being switched from one position to the other position, the method comprising:

reversing the upstream and downstream sides of the particulate filter by the reversal device at a switching speed corresponding to an operation state of the engine.

5. An exhaust gas purifier for an internal combustion engine, comprising:

a particulate filter disposed in an exhaust system of the engine to collect and oxidize particulates; and a reversal device for reversing upstream and downstream sides of the particulate filter, wherein the particulate filter has a collecting wall for collecting particulates, the collecting wall has first and second collecting surfaces, and the first and second collecting surfaces of the collecting wall are used alternately to collect particulates through reversal of the upstream and downstream sides of the particulate filter by the reversal device, wherein the reversal device has a valve body and reverses the upstream and downstream sides of the particulate filter by switching the valve body from one position to the other position, and at least a portion of exhaust gas bypasses the particulate filter while the valve body is being switched from one position to the other position, and wherein the reversal device reverses the upstream and downstream sides of the particulate filter if the amount of particulates discharged from a combustion chamber of the engine has become equal to or smaller than a set discharge amount.

6. The exhaust gas purifier according to claim 5, wherein the reversal device does not reverse the upstream and downstream sides of the particulate filter even if the discharge amount of particulates has become equal to or smaller than the set discharge amount unless a set period has elapsed or a set running distance has been covered after the reversal of the upstream and downstream sides of the particulate filter.

7. The exhaust gas purifier according to claim 5, wherein the reversal device increases the switching speed of the valve body if it is judged during the switching of the valve body that the engine is being accelerated.

8. The exhaust gas purifier according to claim 5, wherein it is determined that the discharge amount of particulates has become equal to or smaller than the set discharge amount as soon as it is judged that the fuel injection amount is equal to or smaller than a set injection amount, and the upstream and downstream sides of the particulate filter are reversed.

9. The exhaust gas purifier according to claim 5, wherein it is determined that the discharge amount of particulates has become equal to or smaller than the set discharge amount as soon as it is judged that the depression amount of an accelerator pedal is equal to or smaller than a set depression amount, and the upstream and downstream sides of the particulate filter are reversed.

10. The exhaust gas purifier according to claim 5, wherein it is determined that the discharge amount of particulates has become equal to or smaller than the set discharge amount as soon as it is judged that a clutch pedal has been depressed, and the upstream and downstream sides of the particulate filter are reversed.

11. The exhaust gas purifier according to claim 5, wherein an active oxygen discharging agent is carried on the collecting wall, and active oxygen discharged from the active oxygen discharging agent oxidizes particulates.

12. The exhaust gas purifier according to claim 11, wherein the active oxygen discharging agent absorbs and retains oxygen if there is an excessive amount of oxygen around, and discharges the retained oxygen in the form of active oxygen if the concentration of ambient oxygen decreases.

13. The exhaust gas purifier according to claim 5, wherein it is determined that the discharge amount of particulates has become equal to or smaller than the set discharge amount as soon as it is judged that the engine is being decelerated, and the upstream and downstream sides of the particulate filter are reversed.

14. The exhaust gas purifier according to claim 13, wherein it is judged upon detection of depression of a brake pedal that the engine is being decelerated.

15. The exhaust gas purifier according to claim 13, wherein it is judged upon detection of a decrease in the depression amount of an accelerator pedal that the engine is being decelerated.

16. A method for purifying an exhaust gas of an internal combustion engine, including a particulate filter disposed in an exhaust system of the engine to collect and oxidize particulates and a reversal device for reversing upstream and downstream sides of the particulate filter, wherein the particulate filter has a collecting wall for collecting particulates, the collecting wall has first and second collecting surfaces, and the first and second collecting surfaces of the collecting wall are used alternately to collect particulates through reversal of the upstream and downstream sides of the particulate filter by the reversal device, and wherein the reversal device has a valve body and reverses the upstream and downstream sides of the particulate filter by switching the valve body from one position to the other position, and at least a portion of exhaust gas bypasses the particulate filter while the valve body is being switched from one position to the other position, the method comprising:

reversing the upstream and downstream sides of the particulate filter by the reversal device if the amount of particulates discharged from a combustion chamber of the engine has become equal to or smaller than a set discharge amount.

\* \* \* \* \*